United States Patent
Kaneko et al.

(10) Patent No.: US 7,391,484 B2
(45) Date of Patent: Jun. 24, 2008

(54) ELECTRO-OPTICAL METHOD OF MANUFACTURING SPACER LIGHT-SHIELDING FILM SIMULTANEOUSLY WITH SWITCHING UNIT ELEMENT USING SAME MATERIALS AND PROCESS

(75) Inventors: Hideki Kaneko, Shiojiri (JP); Keiji Takizawa, Toyoshina-machi (JP); Kimitaka Kamijo, Shiojiri (JP); Tomoyuki Nakano, Toyoshina-machi (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 11/201,092

(22) Filed: Aug. 11, 2005

(65) Prior Publication Data

US 2006/0038937 A1   Feb. 23, 2006

(30) Foreign Application Priority Data

Aug. 12, 2004   (JP) .............................. 2004-235228

(51) Int. Cl.
*G02F 1/136* (2006.01)

(52) U.S. Cl. ..................... 349/44; 349/113; 349/155

(58) Field of Classification Search ................ 349/44, 349/113, 155
See application file for complete search history.

(56) References Cited

U.S. PATENT DOCUMENTS

| | | | |
|---|---|---|---|
| 6,317,187 B1 * | 11/2001 | Nakajima et al. ........... 349/155 |
| 6,583,846 B1 | 6/2003 | Yanagawa et al. |
| 6,831,728 B2 | 12/2004 | Watanabe et al. |
| 6,839,105 B2 | 1/2005 | Tanaka et al. |
| 6,999,151 B2 * | 2/2006 | Taguchi et al. ............... 349/155 |
| 7,053,974 B2 * | 5/2006 | Hwang ........................ 349/155 |
| 7,161,646 B2 | 1/2007 | Tanaka et al. |
| 2002/0047962 A1 * | 4/2002 | Tanaka et al. ................ 349/110 |
| 2003/0137631 A1 | 7/2003 | Nakayoshi et al. |
| 2005/0248712 A1 * | 11/2005 | Higa et al. ................... 349/155 |
| 2006/0164572 A1 | 7/2006 | Tanaka et al. |

FOREIGN PATENT DOCUMENTS

| | | |
|---|---|---|
| CN | 1343902 A | 4/2002 |
| CN | 1384395 A | 12/2002 |
| JP | A 06-265912 | 9/1994 |
| JP | A 2002-214621 | 7/2002 |

* cited by examiner

*Primary Examiner*—David Nelms
*Assistant Examiner*—John Heyman
(74) *Attorney, Agent, or Firm*—Oliff & Berridge, PLC

(57) ABSTRACT

An electro-optical device includes a substrate; electrodes formed on the substrate; switching elements connected to the electrodes, respectively; an electro-optical material layer disposed on the electrodes and the switching elements; photospacers that regulate the thickness of the electro-optical material layer; and spacer light-shielding films, each being provided between a corresponding photospacer and the substrate. Each of the spacer light-shielding films is made of the same material as at least one of a plurality of elements constituting each of the switching elements.

4 Claims, 14 Drawing Sheets

ELECTRO-OPTICAL METHOD OF MANUFACTURING SPACER LIGHT-SHIELDING FILM SIMULTANEOUSLY WITH SWITCHING UNIT ELEMENT USING SAME MATERIALS AND PROCESS

This application claims the benefit of Japanese Patent Application No. 2004-235228, filed Aug. 12, 2004. The entire disclosure of the prior application is hereby incorporated by reference herein in its entirety.

BACKGROUND OF THE INVENTION

1. Technical Field

The present invention relates to an electro-optical device such as a liquid crystal display, to a method of manufacturing the same, and to an electronic apparatus having the electro-optical device.

2. Related Art

An electro-optical device such as a liquid crystal display has been widely used in electronic apparatuses such as mobile phones and handheld terminals. For example, the electro-optical device has been used as a display device for displaying various information concerning an electronic apparatus. The electro-optical device refers to a device that controls an optical output state according to an electrical input. For example, the electro-optical device may include liquid crystal displays, electroluminescent (EL) devices, plasma display devices and the like.

For example, in liquid crystal displays, electrodes are formed on a pair of substrates, and a liquid crystal layer is interposed between the electrodes. The voltage applied to the electrodes is adjusted to control the orientation of liquid crystal molecules within the liquid crystal layer, and light supplied to the liquid crystal layer is modulated through the orientation control. In such a liquid crystal display, in the related art, a plurality of spacers is provided between the pair of substrates blue, green, and red to maintain the thickness of the liquid crystal layer uniform. There is also known a technique in which these spacers are formed by a photolithographic process (for example, see Japanese Unexamined Patent Application Publication No. 6-265912 (page 3, FIG. 1)).

However, in the spacers (hereinafter, referred to as 'photospacer') formed by the photolithographic process, orientation failures of liquid crystal molecules are likely to occur in the vicinity of the photospacers, which results in optical leakage. As a result, there have been cases in which the display quality of a liquid crystal display deteriorates significantly. Even in electro-optical devices other than liquid crystal displays, when the photospacers are provided, disturbance to the physical properties of an electro-optical material is likely to occur in the vicinity of the photospacers. As a result, there is a possibility that disturbance to the optical characteristics of the electro-optical device will occur.

SUMMARY

An advantage of the invention is that it provides an electro-optical device, including photospacers, which allows a defect in an optical characteristic not to be seen from the outside even when the defect occurs in the electro-optical device due to the presence of the photospacers.

According to an aspect of the invention, an electro-optical device includes a substrate; electrodes formed on the substrate; switching elements connected to the electrodes, respectively; an electro-optical material layer disposed on the electrodes and the switching elements; photospacers that regulate the thickness of the electro-optical material layer; and spacer light-shielding films, each being provided between a corresponding photospacer and the substrate. The spacer light-shielding film is formed of the same material as at least one of a plurality of elements constituting each of the switching elements.

In the specification, the term 'electro-optical material' refers to a material whose optical characteristic varies depending on an electrical condition. More specifically, such electro-optical materials include liquid crystal used in a liquid crystal display, an EL used in an EL device, gas used in a plasma display, and so on. Meanwhile, switching elements include a two-terminal-type switching element such as thin film diode (TFD), a three-terminal-type switching element such as a thin film transistor (TFT), and the like.

In the electro-optical device in the related art, disturbance in the physical property of the electro-optical material, for example, orientation failures of liquid crystal molecules are likely to occur in the vicinity of the photospacers due to the presence of the photospacers, and in response to the disturbance, there is a possibility that optical disturbance, such as optical leakage, will occur. However, according to the invention, the spacer light-shielding films are provided between the photospacers and the substrate, so that such optical disturbance cannot be seen from the outside because the optical disturbance is prevented by the spacer light-shielding films. Accordingly, it is possible to maintain an optical characteristic of an electro-optical device, such as display quality of a liquid crystal display, at a high level.

In addition, the spacer light-shielding film is formed of the same material as at least one of the elements constituting the switching element, so that it is not necessary to prepare specific materials and a dedicated process for forming the spacer light-shielding film. Accordingly, it is possible to reduce material and production costs.

Further, in the electro-optical device according to the invention, it is preferable that a plurality of display dot regions, each being a display unit, and interdot light-shielding regions, each being provided between the display dot regions, be further provided. In this case, the photospacers are preferably provided within the display dot regions, respectively.

In general, on the interdot light-shielding region is formed a so-called 'black mask' blue, green, and red to enhance the contrast of the display. The width of the black mask is very narrow and a surface thereof is not necessarily flat. When the photospacers are provided opposite to the black mask, it is difficult to uniformly maintain the thickness of the electro-optical material layer, e.g., the thickness of the liquid crystal layer formed within the cell gap due to the photospacers because the black mask is narrow and not flat. On the other hand, the display dot region is flat compared to the interdot light-shielding region. Accordingly, when the photospacers are provided within the display dot regions, the thickness of the electro-optical material layer, such as the thickness of the liquid crystal layer, can be uniformly maintained.

Further, in the electro-optical device according to the invention, it is preferable that a second substrate, which is disposed opposite to the substrate with the electro-optical materials therebetween, be further provided, and the second substrate include a plurality of coloring elements with different colors which are disposed so as to overlap the display dot regions and the interdot light-shielding regions. Also, in this case, the interdot light-shielding regions are preferably formed by overlapping the coloring elements having different colors. For example, in the case where the elements composed of three primary colors such as red, green and blue are formed as the coloring elements, the black mask serving as the light-shielding region can be formed by overlapping at least two of the three primary colors.

However, when the interdot light-shielding region is formed in a structure in which the coloring materials overlap, the interdot light-shielding region has a surface with a narrow width and many irregularities. Therefore, when the photospacers are disposed opposite to the interdot light-shielding regions, the function to maintain the thickness of the electro-optical material layer uniform by the photospacers becomes insufficient. On the contrary, when the photospacers are provided within the display dot regions while avoiding the interdot light-shielding regions as described above, the function to maintain the thickness of the electro-optical material layer uniform by the photospacers can be sufficiently realized since the inside of the display dot region is flat.

Further, in the electro-optical device according to the invention, it is preferable that colors of the coloring elements having different colors be red, green and blue, which are three primary colors. In this case, the photospacers are preferably provided corresponding to the display dot region representing blue. Blue is a color where it is difficult to see an optical failure, such as optical leakage, compared to the red and green. For this reason, by providing the photospacers with respect to blue, even when optical defect are generated with the presence of the photospacers, it is possible to suppress such a defect in a state in which the defect is almost invisible.

Furthermore, in the electro-optical device according to the invention, it is preferable that each of the display dot regions have a transmission region within a dot that allows light to pass therethrough and a reflection region within a dot that reflects light therefrom. In this case, each of the photospacers is preferably provided in the reflection region. The electro-optical device constructed above is a so-called transflective electro-optical device. Such an electro-optical device can realize not only transmissive display by using light that passes through the transmission regions, but also reflective display by using light reflected from the reflection regions.

The reflection region within a dot is a region where a reflection film for reflecting light is provided and which is relatively flat. On the other hand, the transmission region within a dot is a region where the reflection film is not provided and which is recessed with respect to the reflection region within a dot. Accordingly, when photospacers are provided corresponding to the transmission regions, there is a possibility that the function to keep the distance constant by the photospacers will be insufficient due to influence of the recess. On the contrary, when the photospacers are respectively provided corresponding to the reflection regions, the distance therebetween can be constantly kept by means of the photospacers since the reflection regions are flat.

In addition, in the electro-optical device according to the invention, it is preferable that a resin layer, which is thin corresponding to the transmission region but thick corresponding to the reflection region within a dot and of which a surface corresponding to the reflection region within a dot is flat, be further provided. Further, it is possible to make the electro-optical material layer corresponding to the transmission region within a dot thicker than the electro-optical material layer corresponding to the reflection region within a dot by forming the electro-optical material layer on the resin layer.

Such a structure is referred to as a so-called 'multi-gap structure'. In general, in the reflection region within a dot, light reflected from the reflection film passes through the electro-optical material layer twice. Meanwhile, in the transmission region within a dot, light passing therethrough passes through the electro-optical material layer only once. Thus, assuming that the thickness of the electro-optical material layer in the reflection region within a dot is equal to the thickness of the electro-optical material layer in the transmission region within a dot, an undesirable display state where the color is dark in the reflection region and the color is light in the transmission region occurs. One of methods to solve the problem is to use a multi-gap structure. More specifically, in the multi-gap structure, an optical path difference between the transmission region and the reflection region becomes small by making the electro-optical material layer corresponding to the transmission region thicker than the electro-optical material layer corresponding to reflection region, and accordingly, uniform display between the transmission display and the reflection display can be realized.

In the electro-optical device having the multi-gap structure, recesses are formed in the transmission region within a dot blue, green, and red to increase the thickness of the electro-optical material layer. Accordingly, when photospacers are provided corresponding to the transmission region, there is a possibility that the function of the photospacers to keep the distance constant will be insufficient due to the influence of the recesses. On the contrary, when the photospacers are provided corresponding to the reflection region within a dot, it is possible to keep the distance constant by means of the photospacers because the reflection region is flat.

Further, in the electro-optical device according to the invention, it is preferable that the switching element have a laminated structure composed of a plurality of layers. Also, in this case, the spacer light-shielding film is preferably formed by laminating the same material as at least two layers of the laminated structure constituting the switching element.

Furthermore, in the electro-optical device according to the invention, it is preferable that the switching element be a thin film diode having a laminated structure in which tantalum/insulating film/chrome are sequentially laminated from the substrate side. The diode is a so-called TFD. In this case, the spacer light-shielding film is preferably formed by using a simplex such as tantalum or chrome, or a laminated structure of tantalum/chrome sequentially laminated from the substrate side. Thereby, the spacer light-shielding film can be formed at the same time with a TFD element, so that it is advantageous in terms of material and production costs.

Moreover, in the electro-optical device according to the invention, it is preferable that a surface of the substrate not facing the liquid crystal layer be a viewing side, and a retardation film and a polarizer be provided on the surface at the viewing side of the substrate, sequentially from the substrate side. As such, in a case in which the retardation film and the polarizer are formed with respect to the spacer light-shielding film, when natural light L0 is incident on a polarizer 14, linearly-polarized light L1 is selected from the natural light, and the linearly-polarized light L1 becomes circularly-polarized light L2 while passing through the retardation film 13, as shown in FIG. 6.

The circularly-polarized light L2 is reflected from the spacer light-shielding film 19 to become circularly-polarized light L3 having a different polarizing direction, and then the circularly-polarized light L3 passes through the retardation films 13 again. At this time, the circularly-polarized light L3 becomes linearly-polarized light L4 having a different polarizing axis, and then the linearly-polarized light L4 is incident on the polarizer 14 again. At this time, since a transmission axis of the polarizer 14 is set to a direction in which the linear polarized light L4 is not transmitted, the polarized light L4 cannot pass through the polarizer 14. As such, the light reflected from the spacer light-shielding film 19 cannot be seen from the outside of the polarizer 14. That is, when the spacer light-shielding films 19 are respectively provided at locations where the photospacers 22 exist according to the invention, light reflected from the spacer light-shielding films 19 cannot exit to the outside by further providing the retardation films 13 and the polarizers 14. Accordingly, it is possible to prevent the spacer light-shielding films 19 from shining when the electro-optical device is viewed from the outside. Also, it is possible to prevent the display quality from being deteriorated by providing the photospacers 22 and the spacer light-shielding films 19.

Further, according to another aspect of the invention, an electro-optical device in which electro-optical materials are interposed between a pair of substrates includes electrodes that are disposed on one of the substrates to apply a voltage to the electro-optical materials; photospacers that are respectively disposed on a corresponding electrode to regulate the thickness of a layer composed of the electro-optical materials; and spacer light-shielding films each being provided between a corresponding photospacer and the substrate.

Furthermore, according to still another aspect of the invention, a method of manufacturing an electro-optical device includes: forming switching elements on a substrate; forming spacer light-shielding films on the substrate; forming electrodes on the substrate to be electrically connected to the switching elements, respectively; forming photospacers for regulating the thickness of an electro-optical material layer on the spacer light-shielding films; and positioning the electro-optical material layer on the substrate to overlap the electrodes. At this time, the forming of the spacer light-shielding films is performed using the same material and process as those used to form at least one of a plurality of elements constituting each of the switching elements.

In the above-mentioned method of manufacturing the electro-optical device, it is possible to reliably manufacture the electro-optical device according to the invention. Also, in typical electro-optical devices using photospacers, disturbance in the physical property of the electro-optical material, for example, orientation failures of liquid crystal molecules are likely to occur in the vicinity of the photospacers due to the presence of the photospacers, and in response to the disturbance, there is a possibility that optical disturbance, such as optical leakage, will occur. However, according to the invention, the spacer light-shielding films are provided between the photospacers and the substrate, so that such optical disturbance cannot be seen from the outside because the optical disturbance is prevented by the spacer light-shielding films. As a result, in the electro-optical device manufactured by the method of the invention described above, it is possible to maintain a display quality of the liquid crystal display, such as an optical characteristic of an electro-optical device, at a high level.

Further, the spacer light-shielding films are formed by using the same material as at least one of the elements constituting each of the switching elements, so that it is not necessary to prepare specific materials and a dedicated process for forming the spacer light-shielding films. Accordingly, the invention is advantageous in terms of material and production costs.

Furthermore, in the method of manufacturing the electro-optical device according to the invention, it is preferable that forming interdot light-shielding regions be further included to bury a plurality of display dot regions, each being a display unit. In this case, the photospacers are preferably provided within the display dot regions, respectively.

In general, on the interdot light-shielding region is formed a so-called 'black mask' blue, green, and red to enhance the contrast of the display. The width of the black mask is very narrow and a surface thereof is not necessarily flat. When the photospacers are provided opposite to the black mask, it is difficult to uniformly maintain the thickness of the electro-optical material layer, e.g., the thickness of the liquid crystal layer formed within the cell gap due to the photospacers because the black mask is narrow and not flat. On the other hand, the display dot region is flat compared to the interdot light-shielding region. Accordingly, when the photospacers are provided within the display dot regions, the thickness of the electro-optical material layer, such as the thickness of the liquid crystal layer, can be uniformly maintained.

In addition, in the method of manufacturing the electro-optical device according to the invention, it is preferable that forming a plurality of coloring elements, each having a different color, at a side opposite to the substrate with the electro-optical materials therebetween, be further included. In this case, in the forming of the interdot light-shielding regions, the interdot light-shielding regions are preferably formed by overlapping the coloring elements having different colors. For example, in a case where coloring elements, having three primary colors of red, green and blue, are formed, the black mask, serving as the light-shielding region, can be formed by overlapping at least two coloring elements having two of the three primary colors.

However, when the interdot light-shielding region is formed in a structure in which the coloring materials overlap, the interdot light-shielding region has a surface with a narrow width and many irregularities. Therefore, when the photospacers are disposed opposite to the interdot light-shielding regions, the function of the photospacers to maintain the thickness of the electro-optical material layer uniform becomes insufficient. On the contrary, when the photospacers are provided within the display dot regions while avoiding the interdot light-shielding regions as described above, the function to maintain the thickness of the electro-optical material layer uniform by the photospacers can be sufficiently realized since the inside of the display dot region is flat.

Further, in the method of manufacturing the electro-optical device according to the invention, preferably, the forming of the switching elements includes forming a first metal on the substrate; forming an insulating film on the first metal; and forming a second metal on the insulating film. In this case, the forming of the spacer light-shielding films is preferably performed using the same material and process as those used to form the first or second metal. Also, the first metal can be made of tantalum, and the second metal can be made of chrome. As such, the spacer light-shielding films can be formed simultaneously with the switching elements in a process of forming the switching elements by forming each of the spacer light-shielding films simultaneously with a portion of each of the switching elements, so that it is possible to suppress material and production costs at a low level.

Furthermore, according to still another aspect of the invention, a method of manufacturing an electro-optical device in which electro-optical materials are interposed between a pair of substrates includes: forming spacer light-shielding films on a substrate; forming electrodes that apply a voltage to the electro-optical materials to overlap the spacer light-shielding films in plan view, respectively; forming photospacers for regulating the thickness of the electro-optical material layer on the spacer light-shielding films, respectively; and positioning the electro-optical material layer on the substrate to overlap the electrodes.

Moreover, according to still another aspect of the invention, an electronic apparatus includes the above-mentioned electro-optical device. The electronic apparatus includes mobile phones, handheld terminals, and so on. In the electro-optical device according to the invention, since the spacer light-shielding films are provided between the photospacers and the substrate, the optical disturbance caused by the presence of the photospacers cannot be seen from the outside by means of the spacer light-shielding films. Accordingly, it is possible to maintain an optical characteristic of an electro-optical device, such as display quality of the liquid crystal display, at a high level. For this reason, even in the electronic apparatus according to the invention, which includes the electro-optical device, it is possible to maintain the optical characteristic of the electro-optical device in a desirable state.

BRIEF DESCRIPTION OF THE DRAWINGS

The invention will be described with reference to the accompanying drawings, wherein like numbers reference like elements, and wherein.

DESCRIPTION OF THE EMBODIMENTS

First Embodiment of Electro-Optical Device

Figure 1:
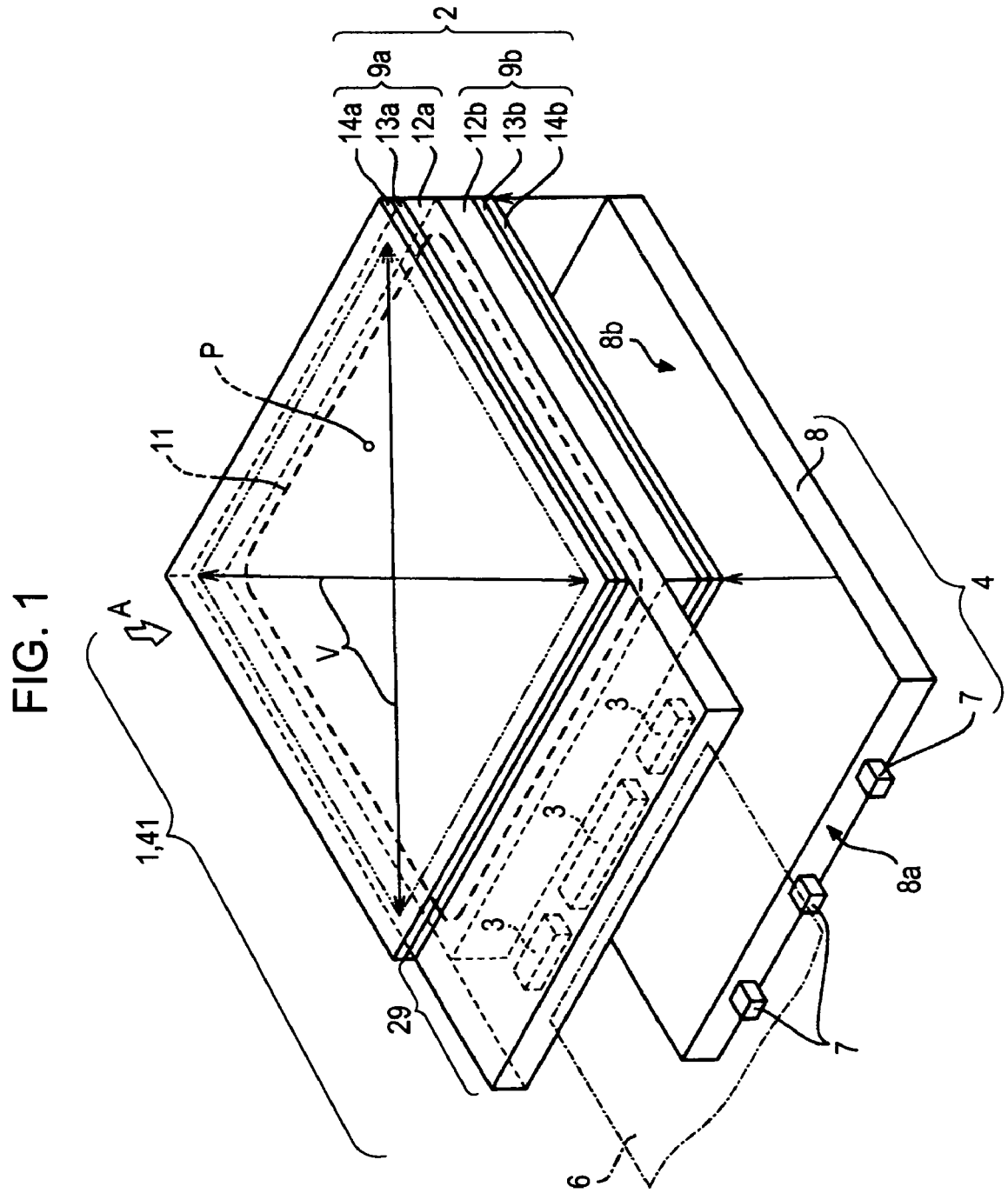
FIG. 1 is a perspective view illustrating an electro-optical device according to an embodiment of the invention.

Hereinafter, an electro-optical device according to the invention will be described by using a liquid crystal display, which is an example thereof. However, it is to be understood that the invention is not limited thereto. Further, in the following description, the scale of each layer or member is adjusted blue, green, and red to have a recognizable size in the drawings.

Figure 2:
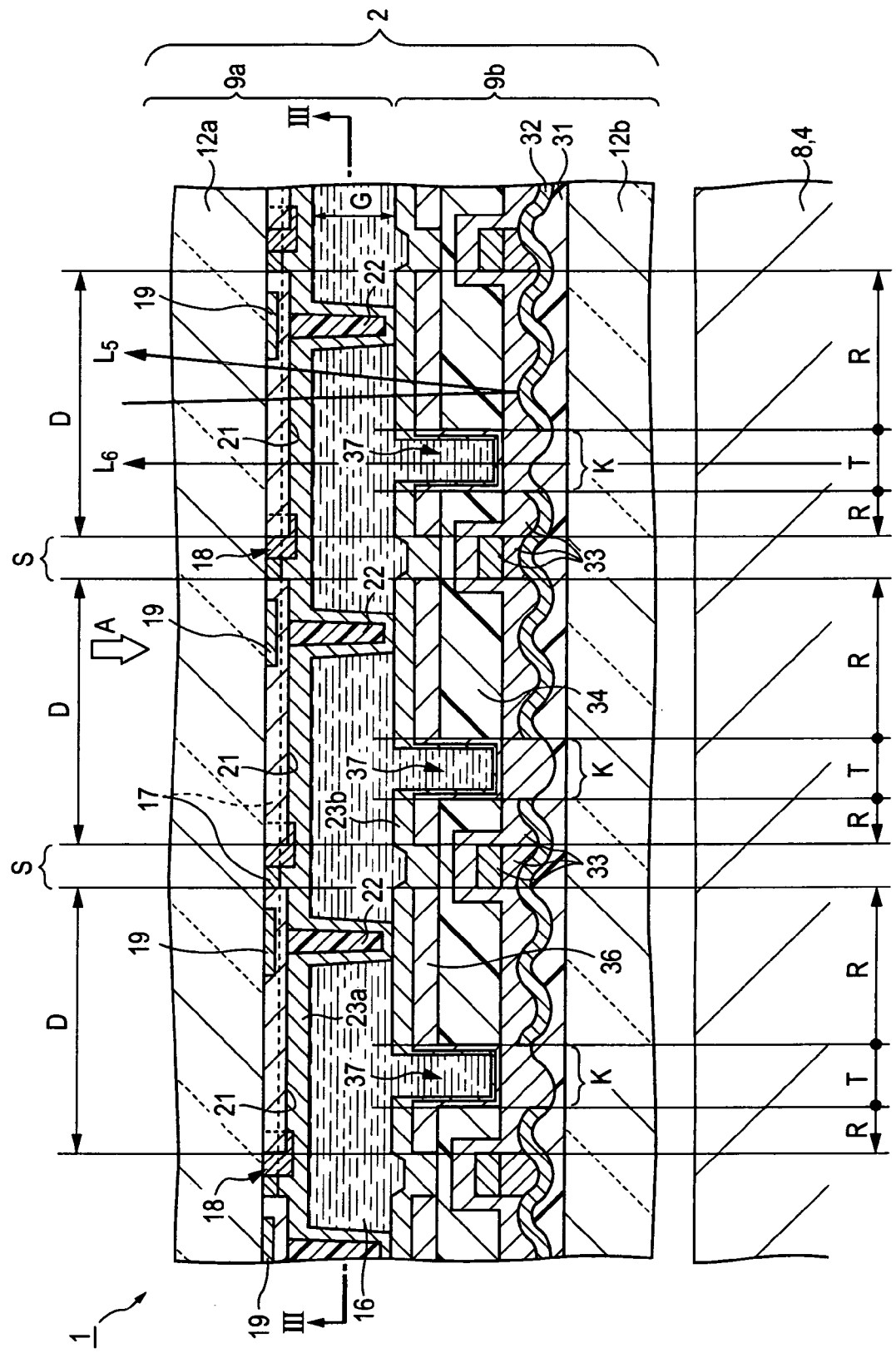
FIG. 2 is a cross-sectional view of a pixel unit indicated by an arrow 'P' in FIG. 1.
Figure 3:
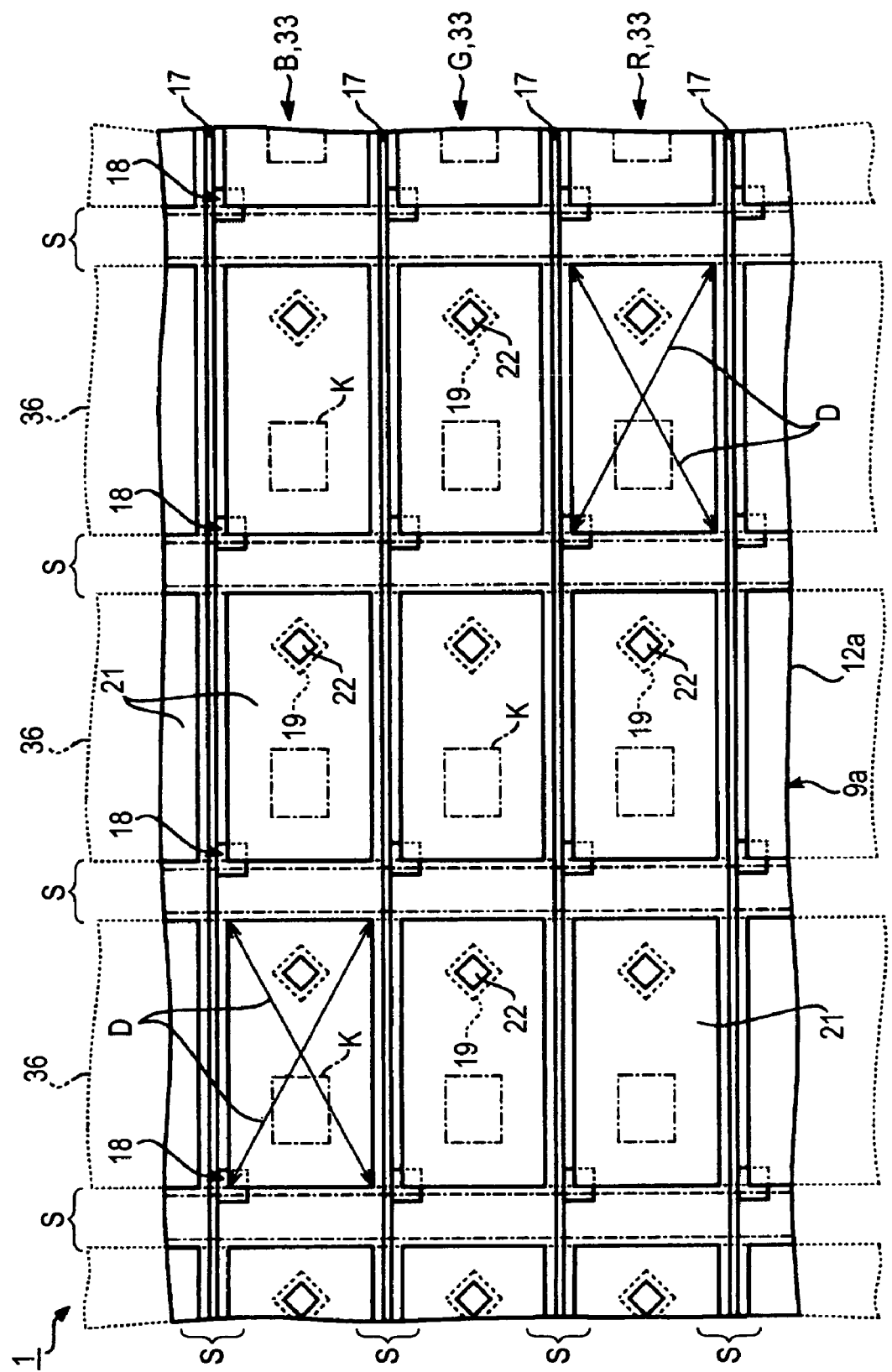
FIG. 3 is a plan view showing the pixel unit taken along the line III-III in FIG. 2.

FIG. 1 shows a liquid crystal display which is an embodiment of the electro-optical device according to the invention. The liquid crystal display is an active-matrix-type liquid crystal display using TFD elements, which are two-terminal-type non-linear elements, as switching elements. FIG. 2 shows a cross-sectional structure of a pixel unit indicated by an arrow 'P' in FIG. 1. Further, FIG. 3 shows a planar structure of the pixel unit taken along the line III-III in FIG. 2.

Referring to FIG. 1, the liquid crystal display 1 serving as an electro-optical device includes a liquid crystal panel 2 serving as an electro-optical panel, driving ICs 3 mounted on the liquid crystal panel 2, a lighting unit 4 attached to the liquid crystal panel 2, and a flexible printed circuit (FPC) 6 which serves as a wiring substrate and is connected to the periphery of the liquid crystal panel 2. In the liquid crystal display 1, a side indicated by an arrow 'A' is a viewing side. The lighting unit 4 has light-emitting diodes (LEDs) 7 serving as light sources, and a light guiding member 8 that introduces light emitted from the LEDs 7 thereto to output the light to the liquid crystal panel 2 in a plane shape. When viewed from the viewing direction indicated by the arrow 'A', the lighting unit 4 is disposed on a back side of the liquid crystal panel 2 to serve as a backlight.

The liquid crystal panel 2 is formed by bonding an element substrate 9a and a color filter substrate 9b in a square or rectangular shape by using a sealant 11 having a frame shape. A gap, a so-called cell gap G, is formed between the element substrate 9a and the color filter substrate 9b, as shown in FIG. 2. The cell gap G is filled with liquid crystal to form a liquid crystal layer 16. Twisted nematic (TN) liquid crystal can be used as the liquid crystal.

In FIG. 1, the element substrate 9a includes a first substrate 12a having transmittance, a retardation film 13a mounted on an outer surface of the first transmissive substrate 12a by bonding or the like, and a polarizer 14a mounted on the retardation film 13a by bonding or the like. Meanwhile, the color filter substrate 9b includes a second substrate 12b having transmittance, a retardation film 13b mounted on an outer surface of the second transmissive substrate 12b by bonding or the like, and a polarizer 14b mounted on the retardation film 13b by bonding or the like. The first and second transmissive substrates 12a and 12b can be made of glass, plastic and the like.

On an inner surface of the first transmissive substrate 12a, that is, on a surface of the first transmissive substrate 12a facing the liquid crystal, are formed wiring lines 17 serving as data lines, TFD elements 18 serving as switching elements, a spacer light-shielding film 19, dot electrodes 21, photospacers 22, and an alignment film 23a, as shown in FIG. 2. The alignment film 23a can be made of polyimide, and a rubbing process is performed on a surface thereof. The rubbing process decides initial orientations of liquid crystal molecules in the vicinity of the element substrate 9a.

Figure 4:
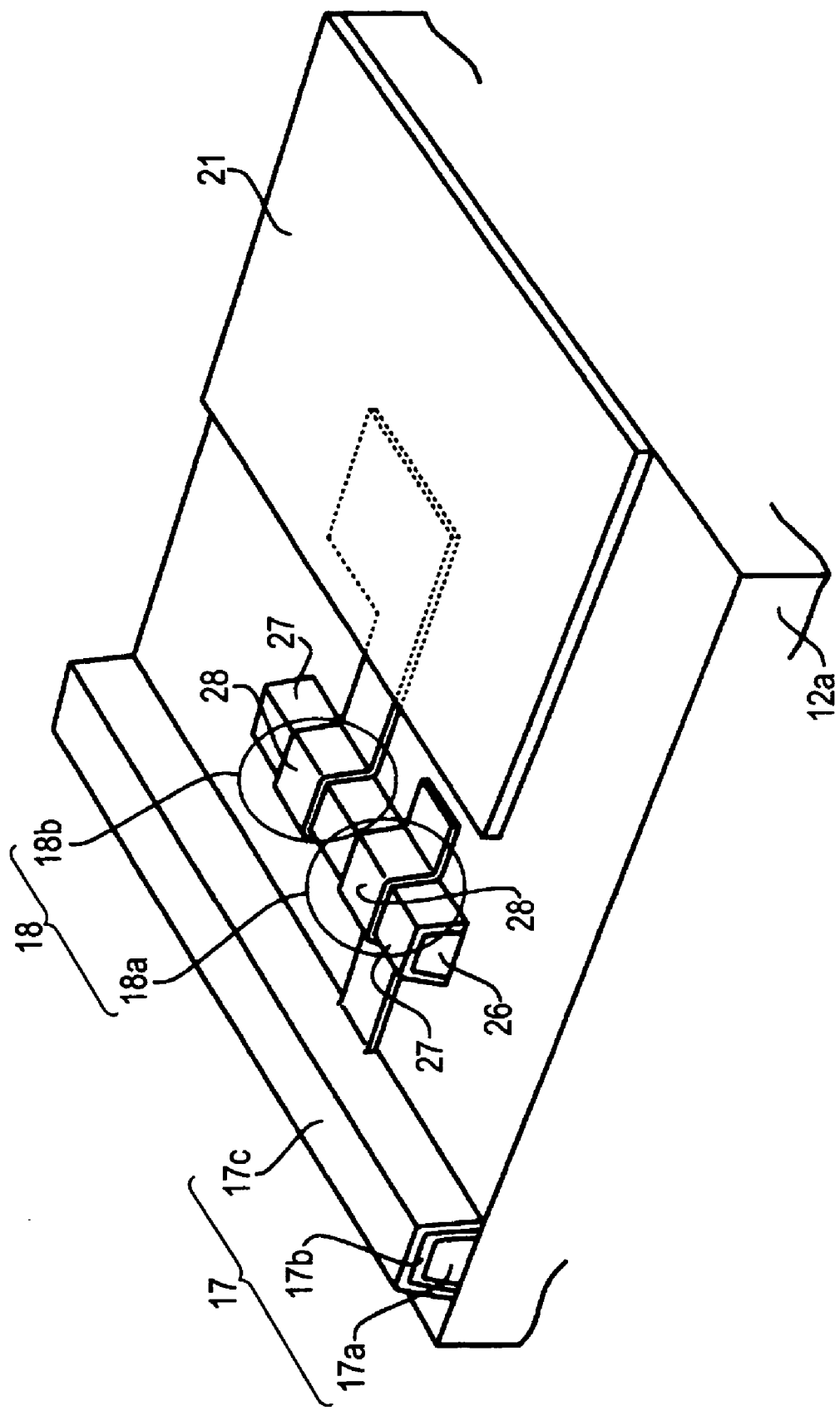
FIG. 4 is a perspective view illustrating an example of a TFD element.

The wiring lines 17 are formed by laminating a first layer 17a, a second layer 17b, and a third layer 17c, as shown in FIG. 4. Further, the TFD element 18 has a first TFD component 18a and a second TFD component 18b, which are connected in series to each other. Each of the TFD components 18a and 18b has a first metal 26, an insulating film 27, and a second metal 28.

The first metal 26 of the TFD element 18 and the first layer 17a of the wiring line 17 are made of tantalum (Ta), for example. The insulating film 27 of the TFD element 18 and the second layer 17b of the wiring line 17 are oxide films formed by an anodic oxidization process or the like. Further, the second metal 28 of the TFD element 18 and the third layer 17c of the wiring line 17 are made of chrome (Cr), for example.

The second metal 28 of the first TFD element 18a and the third layer 17c of the wiring line 17 are made of the same material. Further, the dot electrode 21 is formed on the substrate 12a to be electrically connected to the second metal 28 of the second TFD element 18b. The dot electrode 21 is made of metal oxide such as indium tin oxide (ITO).

The spacer light-shielding film 19 in FIG. 2 is formed within a region where the dot electrode 21 is formed, as shown in FIG. 3. Further, the photospacer 22 is formed on the dot electrode 21 in a region overlapping the spacer light-shielding film 19. The photospacer 22 serves to make the cell gap G, i.e., the thickness of the liquid crystal layer 16 uniform over the entire surface of the liquid crystal panel 2. The spacer light-shielding film 19 and the photospacer 22 each have an approximately lozenge-shaped cross section. Furthermore, the area of the spacer light-shielding film 19 is larger than that of a bottom surface of the photospacer 22. The photospacer 22 is made of a negative-type resist material such as a negative-type photosensitive resin.

Further, the spacer light-shielding film 19 is formed by using one of the first metal 26 and the second metal 28, which are elements constituting the TFD element 18 of FIG. 4, or a laminated structure of the first metal 26 and the second metal 28. For example, when the first metal 26 is made of tantalum and the second metal 28 is made of chrome, the spacer light-shielding film 19 can be formed by using one of tantalum simplex, chrome simplex, and a laminated structure of tantalum and chrome.

In FIG. 2, a resin layer 31 is formed on an inner surface of the second transmissive substrate 12b constituting the color filter substrate 9b, i.e., on a surface of the second transmissive substrate 12b facing the liquid crystal. Also, a reflection film 32 is formed on the resin layer 31, a coloring element 33 is formed on the reflection film 32, an overcoat layer 34 serving as a resin layer is formed on the coloring element 33, a plurality of strip-shaped electrodes 36 is formed on the overcoat layer 34, and the alignment film 23b is formed on the strip-shaped electrodes 36. The alignment film 23b is made of polyimide, for example. A rubbing process is performed on the surface of the alignment film 23b. The rubbing process determines the initial orientation of liquid crystal molecules in the vicinity of the color filter substrate 9b.

Each of the plurality of the strip-shaped electrodes 36 extends in a direction perpendicular to the plane of the drawing in FIG. 2, i.e., up and down directions from the plane of the drawing in FIG. 3, i.e., a direction orthogonal to the wiring line 17. Further, the plurality of strip-shaped electrodes 36 are arranged parallel to each other at a predetermined distance in the left and right directions of FIG. 2. Therefore, the plurality of strip-shaped electrodes 36 are formed in a strip manner, when viewed from the direction of the arrow 'A'. As shown in FIG. 3, the strip-shaped electrodes 36 arranged in a strip manner and the dot electrodes 21 arranged in a dot matrix overlap each other. A plurality of regions D overlapping each other constitute display dot regions each of which is a display unit. Furthermore, the plurality of display dot regions D are arranged in a dot matrix within an area indicated by reference numeral 'V' in FIG. 1. The area V is an effective display area of the liquid crystal display 1. Images such as characters, numbers and figures are displayed within the effective display area V.

In FIG. 2, irregularities are formed on the surface of the resin layer 31. Due to this, the surface of the reflection film 32 laminated on the resin layer 31 also has irregularities. The reflection film 32 may be made of a reflective material such as aluminum (Al), and reflects light incident from the direction of the arrow 'A'. As the irregularities are formed on the surface of the reflection film 32, light reflected from the reflection film 32 becomes scattered light.

The reflection film 32 has an opening K within each of the display dot regions D. The region where the opening K is formed is a transmission region T within a dot, and the region where the reflection film 32 is formed is a reflection region R in the dot. In the reflection region R, light L5, which is incident from the viewing side indicated by the arrow 'A', is reflected from the reflection film 32 to be irradiated onto the liquid crystal layer 16. Meanwhile, in the transmission region T, light L6 emitted from the lighting unit 4 is supplied to the liquid crystal layer 16 through the opening K.

The plurality of coloring elements 33 is formed on the reflection film 32 corresponding to each of the display dot regions D. Further, each of the coloring elements 33 serves as a filter which can transmit a light component having one of the three primary colors of blue (B), green (G), and red (R). A collection of the coloring elements 33 having these colors constitutes a color filter. Various methods for arranging the plurality of coloring elements 33 having different colors in plan view have been proposed in the related art: however, in the present embodiment, a so-called stripe arrangement method is adopted in which coloring elements having colors B, G, and R are respectively arranged parallel to one another in a direction where the wiring lines 17, i.e., data lines extend, and the coloring elements having colors B, G, and R are sequentially arranged in the display dot region D, respectively, in a direction where the strip-shaped electrodes 36, i.e., scanning lines, extend, as shown in FIG. 3. It is, however, to be noted that arrangement methods other than the stripe arrangement method, such as delta arrangement and mosaic arrangement, can be adopted.

Each of the regions between the plurality of the display dot regions D becomes a region S having a lattice shape. The region S is a region that becomes a light-shielding region blue, green, and red to increase the contrast of the display. In the specification, the light-shielding region is referred to as an 'interdot light-shielding region'. The interdot light-shielding region S is formed by overlapping the coloring elements 33 having three different colors, as shown in FIG. 2. In the present embodiment, when forming the color filter, the coloring elements 33 are formed in the order of blue, green, and red. Accordingly, the laminated structure of the coloring elements 33 in the interdot light-shielding region S is in the order of blue, green, and red, when viewed from the second substrate 12b. It is also to be understood that the laminated structure within the interdot light-shielding region S is not limited to the three-color overlapping structure, but can include a combination of two of the three colors, which are blue, green, and red.

The overcoat layer 34 formed on the coloring elements 33 having the three colors serves to prevent disconnections of the strip-shaped electrodes 36 by making a surface on which the strip-shaped electrodes 36 are formed flat. In the present embodiment, a concave portion 37 is formed in the overcoat layer 34, corresponding to the transmission region T within the display dot region D. Thus, in the cell gap G, a recess corresponding to the concave portion 37 is formed in the transmission region T. Due to this, the liquid crystal layer 16 is thick in the transmission region T, but is thin in the reflection region R. Furthermore, although the overcoat layer 34 does not exist in the concave portions 37 in the present embodiment, it is possible to form the overcoat layer 34, which is thinner than that in the reflection region R, on the concave portion 37. Even in this case, it is possible to make the liquid crystal layer 16 in the transmission region T thick and the liquid crystal layer 16 in the reflection region R thin.

As can be seen from FIG. 2, light L5 reflected in the reflection region R passes through the liquid crystal layer 16 twice. On the other hand, light L6 which is transmitted through the transmission region T passes through the liquid crystal layer 16 only once. Accordingly, assuming that the thickness of the liquid crystal layer 16 is the same in the transmission region T and the reflection region R, a difference in colors occurs between the regions, thus deteriorating the color display. On the contrary, as in the present embodiment, if the liquid crystal layer in the transmission region T is made to be thick and the liquid crystal layer in the reflection region R is made to be thin, it is possible to make a difference between colors viewed in these two regions uniform. As such, a structure having a difference between the thickness of the liquid crystal layer 16 in the transmission region T and that in the reflection region R is often referred to as a 'multi-gap structure'.

The plurality of photospacers 22 formed on the element substrate 9a is formed on the dot electrodes 21 as regions corresponding to the spacer light-shielding films 19, respectively, as described above. These photospacers 22 serve to keep the distance of the cell gap G constant in such a manner that they are in contact with the substrate 9b located at an opposite side of the alignment films 23a and 23b. The photospacers 22 are provided within the display dot regions D while avoiding the interdot light-shielding regions S, respectively. Further, the photospacers 22 are provided within the reflection regions R while avoiding the transmission regions, which are recesses, respectively.

The interdot light-shielding region S is narrow and irregularities are likely to be generated on a surface thereof. On the contrary, the display dot region D has a flat surface. Accordingly, if the photospacers 22 are formed corresponding to the display dot regions D instead of corresponding to the interdot light-shielding regions S, a function to keep the distance of the cell gap G constant by the photospacer 22, i.e., a function to maintain the thickness of the liquid crystal layer 16 uniform, can be efficiently realized.

Further, in a case in which a multi-gap structure is adopted, as in the present embodiment, a recess is formed in a portion corresponding to the transmission region T within each of the display dot regions D. Accordingly, when each of the photospacers 22 is formed at the portion corresponding to the transmission region T, it is expected that maintaining the cell gap G uniform by means of the photospacer 22 will be difficult due to the influence of the recess. On the contrary, when each of the photospacers 22 is provided within the reflection region R while avoiding the transmission region T where the recess is formed, as in the present embodiment, it is possible to maintain the cell gap G at a predetermined distance with high precision by the photospacers 22 since the reflection region R is flat.

Furthermore, it has been shown, in FIG. 3, that the photospacers 22 are formed corresponding to the display dot regions D of blue, green, and red, respectively. It is, however, possible to adopt a structure in which the photospacers 22 are provided corresponding only to blue among the three colors but not provided at the remaining two colors.

Figure 5:
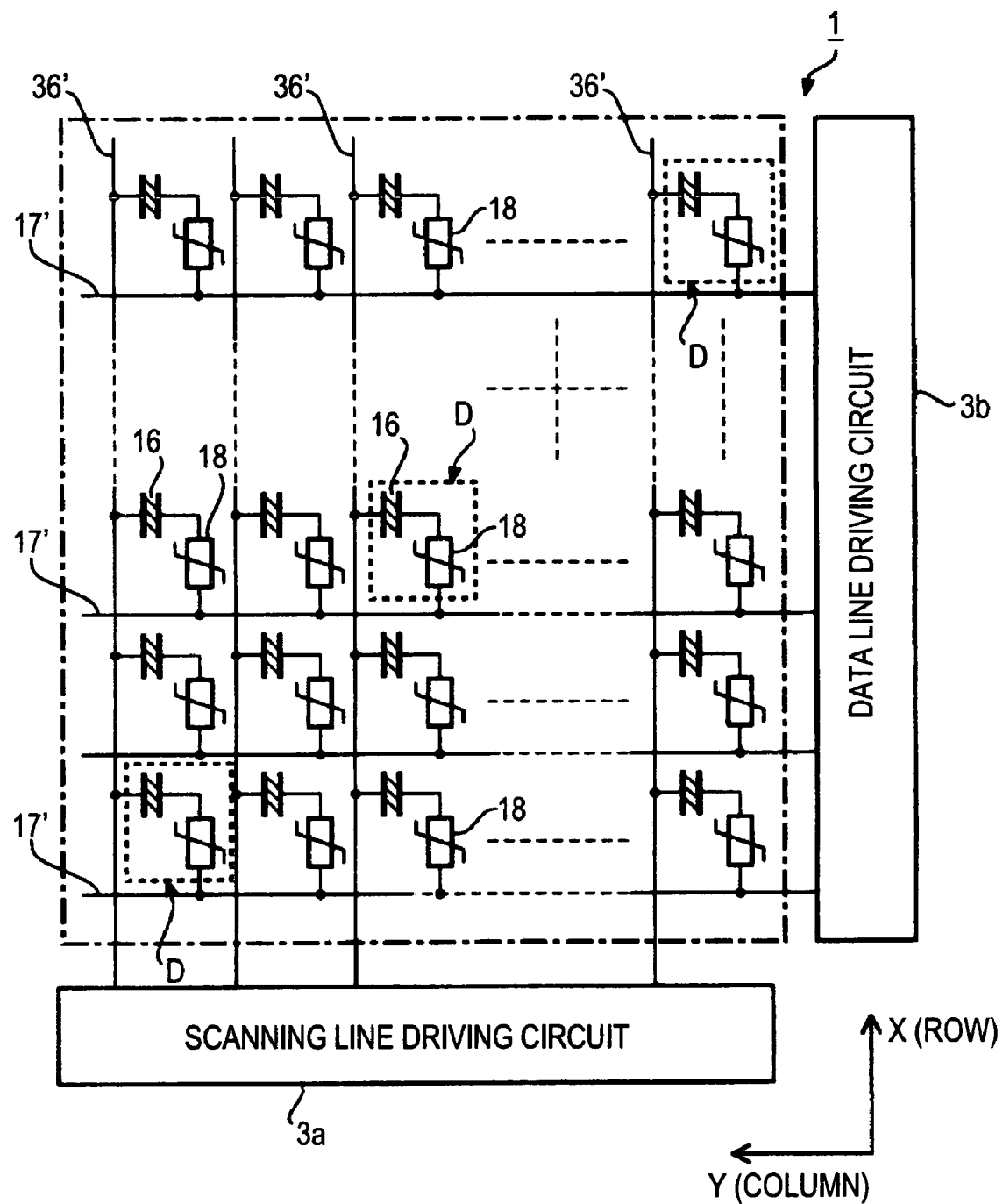
FIG. 5 is an equivalent circuit diagram of the electro-optical device shown in FIG. 1.

FIG. 5 is an electrically equivalent circuit diagram of the electro-optical device shown in FIG. 1. In FIG. 5, a plurality of scanning lines 36' is formed to extend in a row direction X, and a plurality of data lines 17' is formed to extend in a column direction Y. The scanning lines 36' are formed by the strip-shaped electrodes 36 of FIG. 3, and the data lines 17' are formed by the wiring lines 17 of FIG. 3. Display dot regions D are formed at locations where the scanning lines 36' and the data lines 17' cross each other, respectively. In each of the display dot regions D, the liquid crystal layer 16 and the TFD element 18 are connected in series.

In the present embodiment, the liquid crystal layers 16 are connected to the scanning lines 36', and the TFD elements 18 are connected to the data lines 17'. Each of the scanning lines 36' is driven by a scanning line driving circuit 3a. On the other hand, each of the data lines 17 is driven by a data line driving circuit 3b. The scanning line driving circuit 3a and the data line driving circuit 3b are constituted by the driving IC 3 of FIG. 1. With respect to the driving IC 3, both the driving circuits 3a and 3b may be provided through a common IC, or both driving circuits 3a and 3b can be provided separately.

In accordance with the liquid crystal display 1 constructed above, in a case where the liquid crystal display 1 is located outside or inside a room where it is bright in FIG. 1, reflection-type display is carried out by using external light such as sunlight or indoor light. On the other hand, in a case where the liquid crystal display 1 is located outside or inside a room where it is dark, transmission-type display is carried out by using the lighting unit 4 as the backlight.

In the case of the reflection-type display, in FIG. 2, external light L5, which is incident on the liquid crystal panel 2 through the element substrate 9a in the direction of the viewing side 'A', enters the color filter substrate 9b through the liquid crystal layer 16, is reflected from the reflection film 32 in the reflection region R, and is then supplied to the liquid crystal layer 16 again. Meanwhile, in the case of the transmission-type display, the LED 7 of the lighting unit 4 of FIG. 1 is illuminated. Light emitted from the LED 7 is introduced from a light-incident surface 8a of the light guiding member 8 to the light guiding member 8 and is then irradiated from a light-radiation surface 8b as planar light. The irradiated light is supplied to the liquid crystal layer 16 through the opening K in the transmission region T, as indicated by reference numeral 'L6' of FIG. 2.

As such, while light is supplied to the liquid crystal layer 16, a predetermined voltage is applied to the display dot region D, which is specified by a scanning signal and a data signal, between the dot electrodes 21 at the element substrate 9a side and the strip-shaped electrodes 36 at the color filter substrate 9b side. Thereby, the orientation of liquid crystal molecules within the liquid crystal layer 16 is controlled in each of the display dot regions D between a TN configuration and a vertical orientation. As a result, light irradiated from the liquid crystal layer 16 is modulated in each of the display dot regions D. When the modulated light passes through the polarizer 14a (see FIG. 1) of the element substrate 9a, it is allowed to pass or not allowed to pass for each of the display dot regions D according to the polarization characteristic of the polarizer 14a. Thus, images such as characters, numbers and figures can be displayed on the surface of the element substrate 9a, and the images can be viewed in the direction of the arrow 'A'.

In the aforementioned liquid crystal display 1, orientation failures of liquid crystal molecules are likely to occur in the vicinity of the photospacers 22 due to the presence of the photospacers 22, which may result in optical leakage toward the viewing side indicated by the arrow 'A'. However, in the present embodiment, since the spacer light-shielding films 19 are formed between the photospacers 22 and the first transmissive substrate 12a, the optical leakage can be prevented by the spacer light-shielding films 19 and is thus invisible from the outside. Accordingly, it is possible to maintain the display quality of the liquid crystal display 1 at a high level.

Further, the spacer light-shielding film 19 is formed by using at least one of the elements constituting the TFD element 18 serving as the switching element, specifically, one of the first metal 26 and the second metal 28, which are elements constituting the TFD element 18 of FIG. 4, or the laminated structure of the first metal 26 and the second metal 28. Therefore, it is unnecessary to prepare specific materials and a dedicated process for forming the spacer light-shielding films 19, and accordingly, material costs and production costs can be reduced.

In the present embodiment, a black mask, which is formed by overlapping the coloring elements 33 having the three colors of R, G, and B, is formed in the interdot light-shielding region S to enhance the contrast of the display. The black mask has a very narrow width, and a surface thereof is not necessarily flat. In a case where the photospacers 22 are disposed opposite to the black masks, it is difficult for the photospacers 22 to maintain the thickness of the liquid crystal layer uniform, since the black masks are narrow and not flat. On the contrary, in the present embodiment, the photospacers 22 are disposed within the display dot regions D. Since the display dot regions D are flat compared to the interdot light-shielding regions S, the photospacers 22 can maintain the thickness of the liquid crystal layer 16 uniform over the entire surface of the liquid crystal panel 2.

In the present embodiment, it has been described that the black masks are formed within the interdot light-shielding regions S by overlapping the coloring elements 33 having different colors. As such, when the black masks are formed by a structure in which the coloring materials overlap one another, the surfaces of the interdot light-shielding regions S have narrow widths and many irregularities. In the case where the photospacers 22 are disposed opposite to the interdot light-shielding regions S, the function to uniform maintain the thickness of the liquid crystal layer 16 by the photospacers 22 is likely to be insufficient. On the contrary, if the photospacers 22 are disposed within the display dot regions D while avoiding the interdot light-shielding regions S, as in the present embodiment, the function to maintain the thickness of the liquid crystal layer 16 uniform by the photospacers 22 can be sufficiently realized because inside of the display dot region D is flat.

Further, in the embodiment of FIG. 3, it has been shown that the photospacers 22 are formed corresponding to all the display dot regions D, each of the display dot regions D having one of the three coloring elements 33 of which colors are blue, green, and red, respectively. However, the photospacers 22 may be disposed corresponding only to the display dot region D having the blue color. The blue color is a color where it is difficult to see an optical defect, such as optical leakage, compared to the red and green colors. Therefore, when the photospacers 22 are formed with respect to blue, the orientation failure can be suppressed in a state where it can be difficult to be seen even when the orientation failure occurs in the liquid crystal layer 16 due to the photospacers 22.

The liquid crystal display 1 of the present embodiment is a transflective liquid crystal display. That is, the display dot region D includes the transmission region T within a dot which allows light to pass therethrough, and the reflection region R within a dot which reflects light. Under this condition, the photospacers 22 are provided within the reflection regions R, respectively. The reflection region R is a region where the reflection film 32 which reflects light is provided and which is relatively flat. Meanwhile, the transmission region T within a dot is a region where the reflection film 32 is not provided and which is recessed with respect to the reflection region 32 within a dot. As such, if the photospacers 22 are disposed corresponding to the transmission region T within a dot, there is a possibility that the function to keep the distance constant by the photospacers 22 will not be sufficiently realized due to the influence of recesses. On the contrary, when the photospacers 22 are disposed corresponding to the reflection region R within a dot, it is possible to keep the distance constant by means of the photospacers 22 because the reflection region R is flat.

The liquid crystal display 1 according to the present embodiment is a kind of a liquid crystal display having a so-called multi-gap structure. That is, the liquid crystal layer 16 corresponding to the transmission region T within a dot is set to be thicker than the liquid crystal layer 16 corresponding to the reflection region R within a dot. In the liquid crystal display 1 having the multi-gap structure, a recess to make the liquid crystal layer 16 thick is formed in the transmission region T within a dot. Accordingly, when the photospacers 22 are disposed opposite to the transmission regions T within dots, respectively, there is a possibility that the function to keep the distance constant by the photospacers 22 will not be sufficiently realized due to the influence of the recess. On the contrary, when the photospacers 22 are disposed corresponding to the reflection regions R within dots, respectively, the thickness of the liquid crystal layer 16, i.e., the distance of the cell gap G can be kept constant by the photospacers 22, since the reflection region R is flat.

Figure 6:
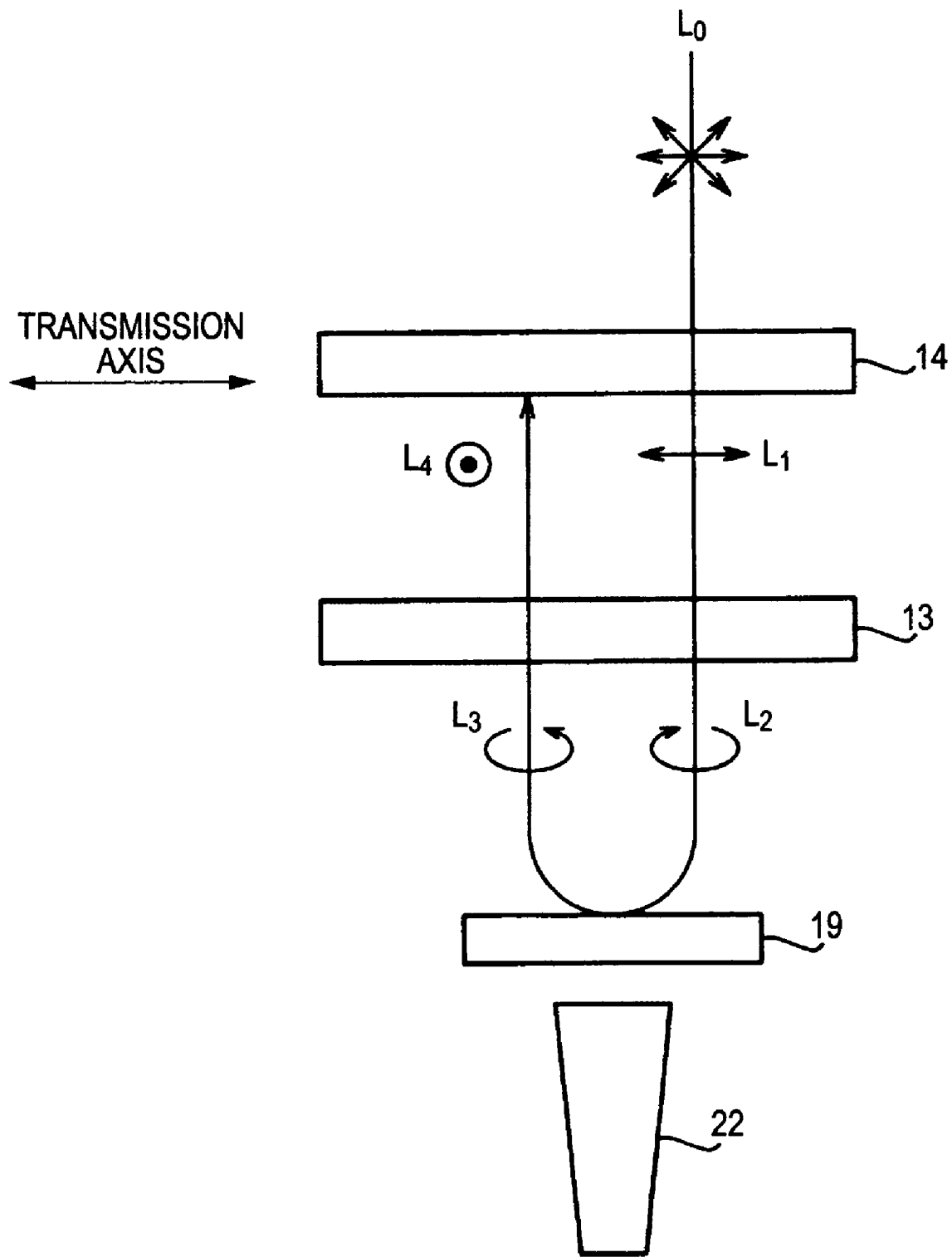
FIG. 6 is a view for explaining optical characteristics of the spacer light-shielding film.

In the present embodiment, a surface of the element substrate 9a not facing the liquid crystal layer 16 is a viewing side. The retardation film 13a and the polarizer 14a are provided on a surface of the viewing side, as shown in FIG. 1. If the retardation film 13a and the polarizer 14a are provided with respect to the spacer light-shielding film 19 (see FIG. 2), light reflected from the spacer light-shielding film 19 is blocked by the polarizer 14, as described above with reference to FIG. 6. Thus, the reflected light cannot be seen from outside of the polarizer 14. In other words, in the present embodiment, in a case where the spacer light-shielding film 19 is provided at a place where the photospacers 22 exist, when the retardation film 13 and the polarizer 14 are further provided, the light reflected by the spacer light-shielding film 19 does not exit to the outside. Accordingly, it is possible to prevent the spacer light-shielding film 19 from shining when viewing the liquid crystal display 1 from the outside. Therefore, by providing the photospacers 22 and the spacer light-shielding films 19, the display quality of the liquid crystal display 1 can be prevented from being deteriorated.

Second Embodiment of Electro-Optical Device

Hereinafter, an electro-optical device according to another embodiment of the invention will be described. Here, it is to be understood that the invention is not limited thereto. Further, in the following description, a scale of each layer or member is adjusted blue, green, and red to have a recognizable size in the drawings.

Figure 8:
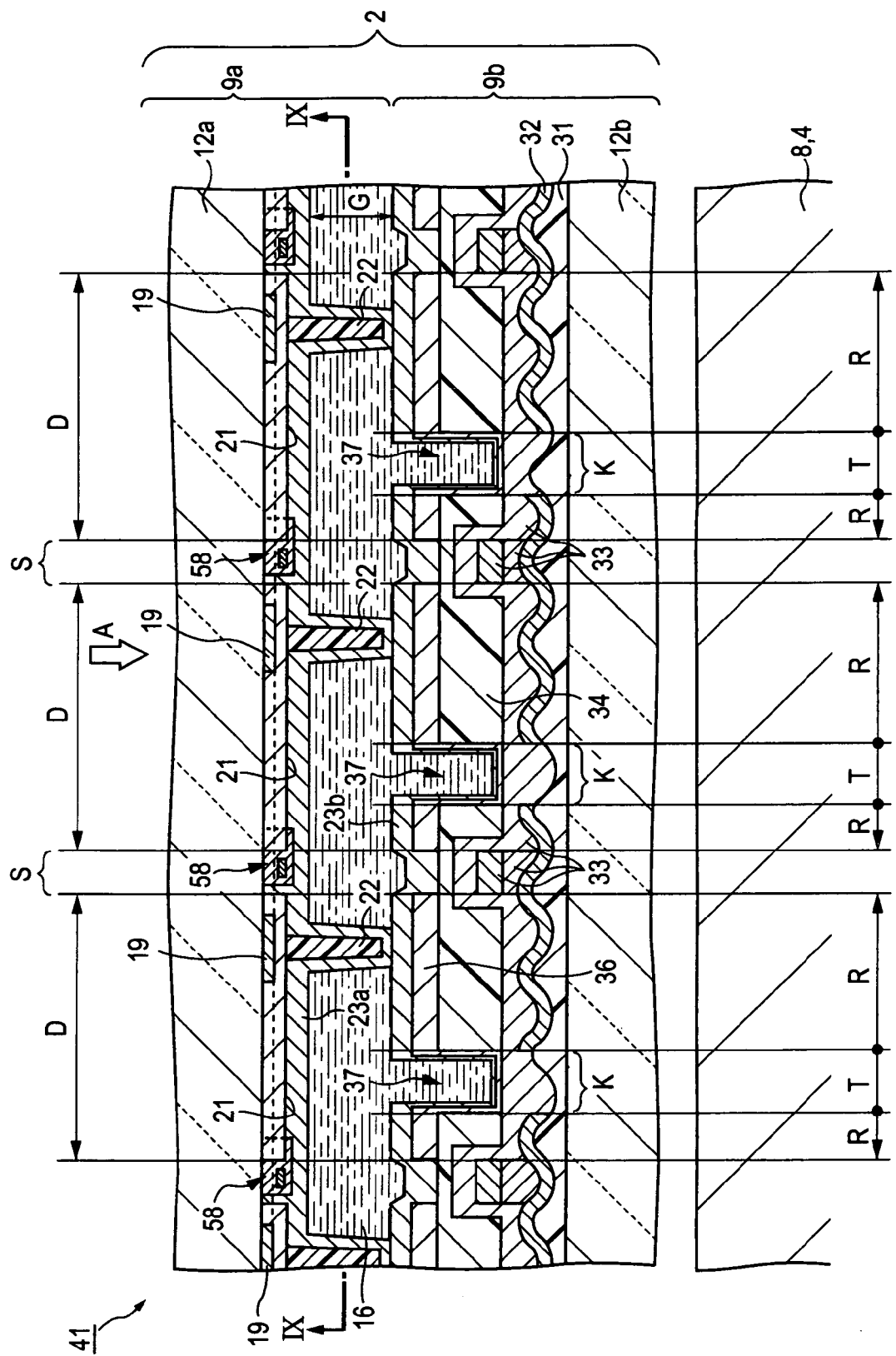
FIG. 8 is a cross-sectional view illustrating major parts of an electro-optical device according to another embodiment of the invention.
Figure 9:
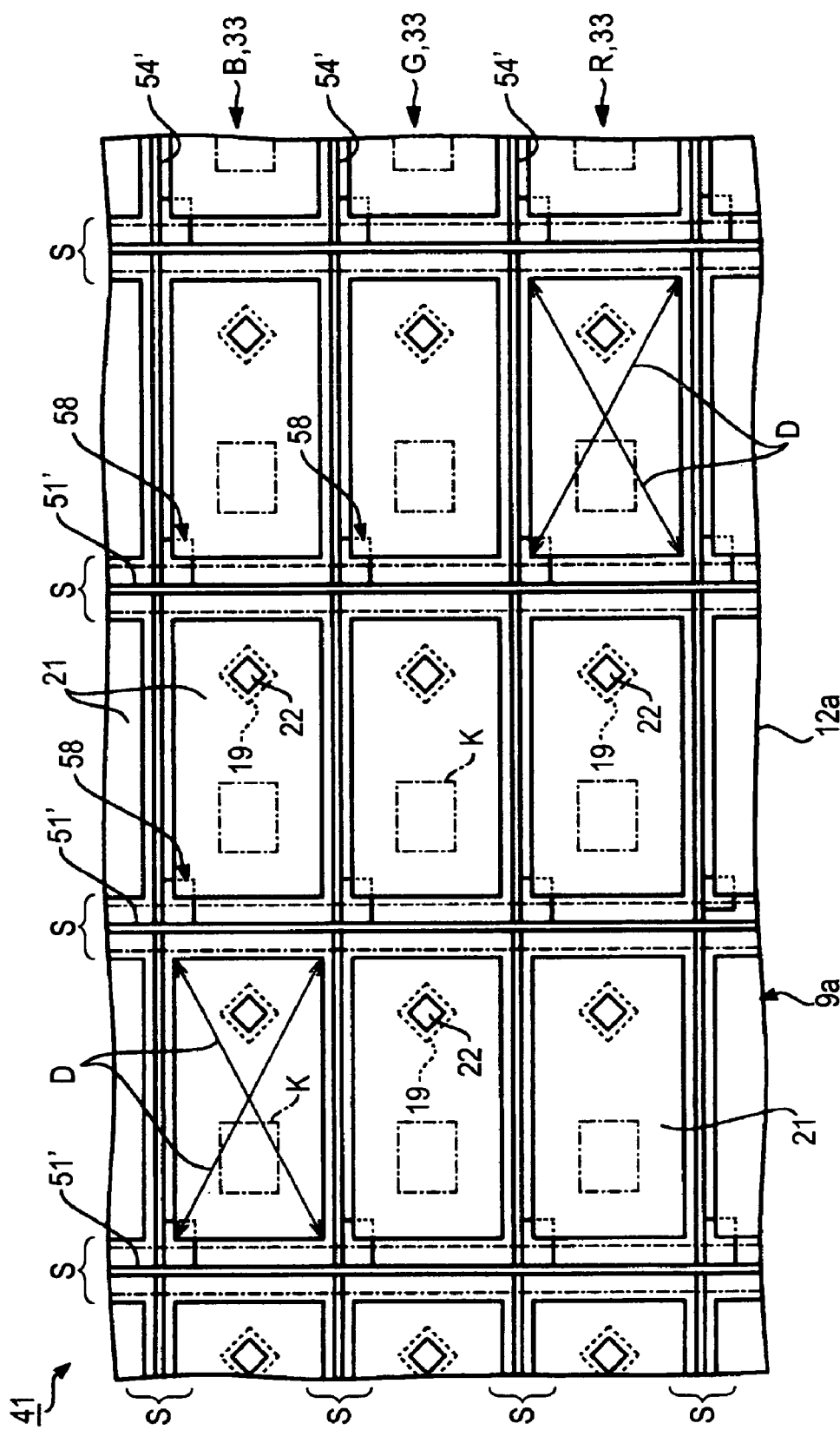
FIG. 9 is a plan view illustrating the electro-optical device taken along the line IX-IX in FIG. 8.

The embodiment to be described relates to an active-matrix-type liquid crystal display using TFT devices, which is a three-terminal-type active element, as switching elements. The external appearance of the liquid crystal display is the same as that shown in FIG. 1. Here, the liquid crystal display of the present embodiment is indicated by reference numeral 41. FIG. 8 shows a cross-sectional structure of the pixel unit that is indicated by the arrow 'P' in FIG. 1. FIG. 9 shows a planar structure of the electro-optical device taken along the line IX-IX in FIG. 8.

In FIGS. 8 and 9 showing main parts of the liquid crystal display 41 according to the present embodiment, the same elements as in FIGS. 2 and 3 used for the description of the previous embodiment have the same reference numerals, and a description thereof will be omitted. The present embodiment shown in FIGS. 8 and 9 is significantly different from the previous embodiment shown in FIG. 2, etc. in that TFT elements 58 are used as switching elements instead of the TFD elements 18 (see FIGS. 2 and 3).

Figure 10:
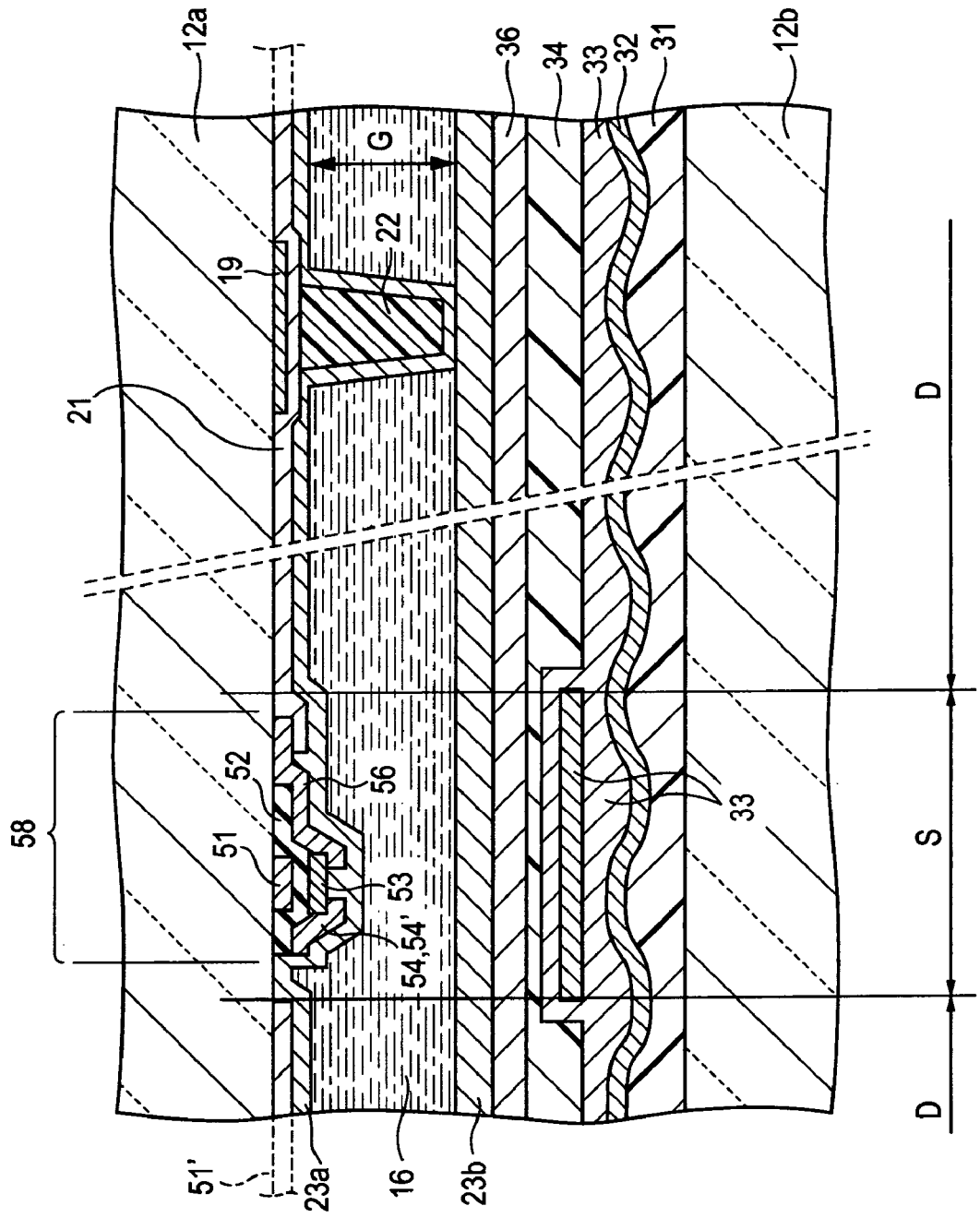
FIG. 10 is a cross-sectional view illustrating an example of a TFT element.

The TFT element 58 employed in the present embodiment is an amorphous silicon TFT. The TFT element 58 includes a gate electrode 51, a gate insulating film 52, a semiconductor layer 53 made of a-Si (amorphous silicon), a source electrode 54, and a drain electrode 56, as shown in FIG. 10. The drain electrode 56 has one end connected to the semiconductor layer 53 and the other end connected to a dot electrode 21. The source electrode 54 is formed as a part of a source electrode line 54' that extends in a direction perpendicular to the plane of the drawings in FIG. 10. Further, the gate electrode 51 extends from a gate electrode line 51' extending in a direction perpendicular to the source electrode line 54', i.e., in the right and left directions of FIG. 10.

In the present embodiment using the TFT element 58, electrodes 36 formed on the color filter substrate 9b are not strip-shaped electrodes but common electrodes disposed over the entire surface of the substrate 12b, in FIG. 8. Further, the source electrode lines 54' and the gate electrode lines 51' are formed on the element substrate 9a in such a manner that they extend perpendicular to each other, as shown in FIG. 9. Furthermore, each of the TFT elements 58 is formed at place where the electrode lines cross each other.

Even in the case of the present embodiment, the distance of the cell gap G, i.e., the thickness of the liquid crystal layer 16 is kept constant by photospacers 22. Further, the spacer light-shielding film 19 is formed between the root portion of the photospacer 22 and the first substrate 12a. The spacer light-shielding film 19 serves to prevent optical leakage, which can occur in the vicinity of the photospacer 22. The spacer light-shielding films 19 are formed by using the same material and process as those used to form one or two or more of elements constituting the TFT element 58. Accordingly, it is possible to prevent material cost or production cost from increasing in forming the spacer light-shielding films 19.

Figure 11:
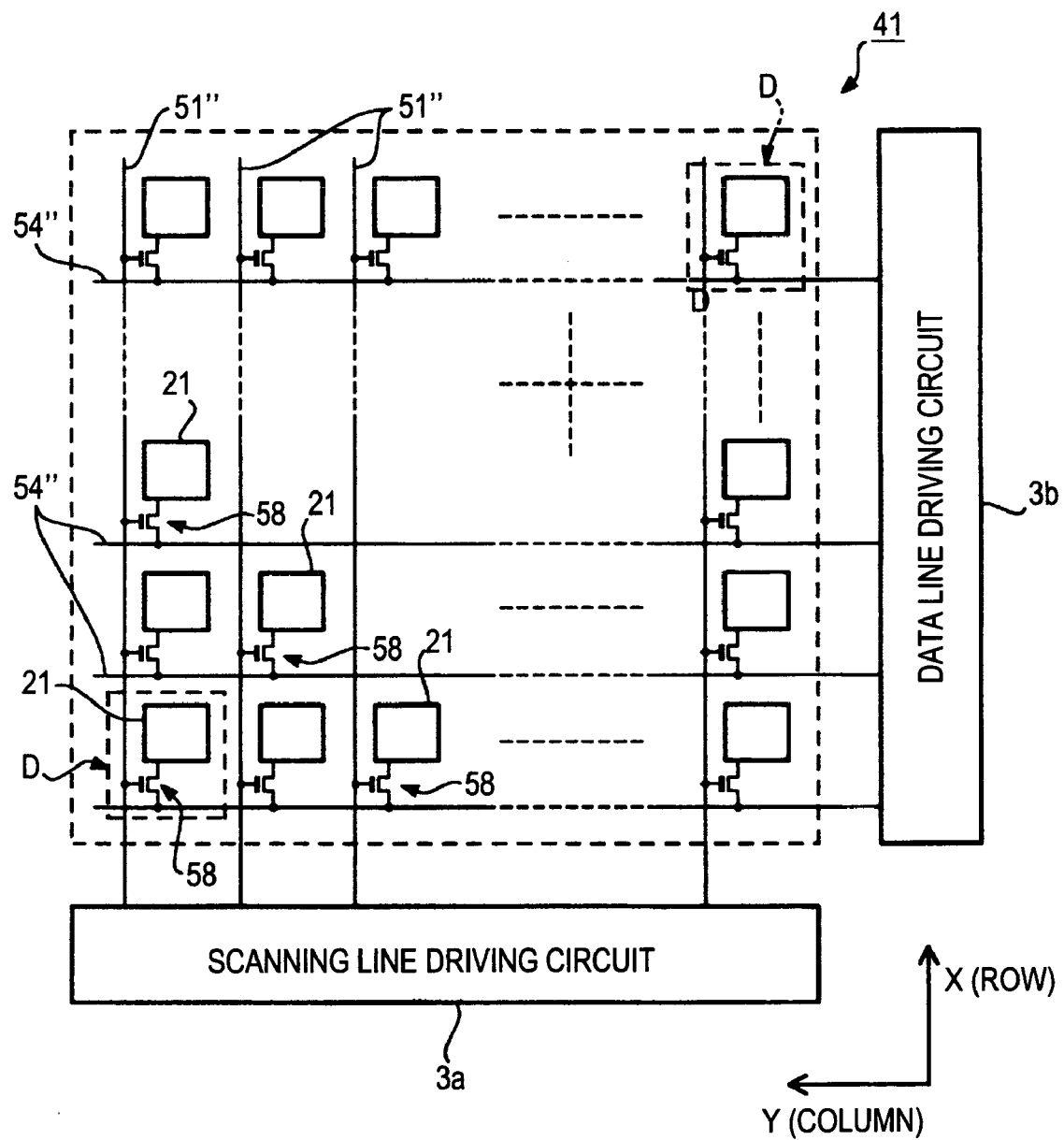
FIG. 11 is an equivalent circuit diagram of the electro-optical device shown in FIG. 8.

FIG. 11 is an electrically equivalent circuit diagram of the liquid crystal display 41 shown in FIG. 8. In FIG. 11, a plurality of scanning lines 51" extends in a row direction X, and a plurality of data lines 54" extends in a column direction Y. The scanning lines 51" are formed by the gate electrode lines 51' of FIG. 9 and the data lines 54" are formed by the source electrode lines 54' of FIG. 9. Display dot regions D are formed at portions where the scanning lines 51" and the data lines 54" cross, respectively. In each of the display dot regions D, the TFT element 58 and the dot electrode 21 are connected in series. The scanning lines 51" are driven by the scanning line driving circuit 3a. On the other hand, the data lines 54" are driven by the data line driving circuit 3b. The scanning line driving circuit 3a and the data line driving circuit 3b are constituted by the driving ICs 3 of FIG. 1. With respect to the driving ICs 3, both of the driving circuits 3a and 3b can be provided as a common IC, or the driving circuits 3a and 3b can be provided separately.

A scanning signal is supplied to the gate of the TFT element 58, and a data signal is supplied to the source of the TFT element 58. If the TFT element 58 is turned on, the TFT element 58 and a corresponding dot electrode 21 is electrically connected to each other, and thus a write operation is performed on liquid crystal in a corresponding display dot region D. Meanwhile, if the TFT element 58 is turned off, the write state is held. Through a series of writing and holding operations, liquid crystal molecules are controlled between a TN structure and a vertical orientation.

In the liquid crystal display 41 according to the present embodiment, the same effects as in the previous embodiment shown in FIG. 2 can be obtained by disposing the spacer light-shielding films 19 at the root portions of the photospacers 22, respectively, as shown in FIG. 8. That is, although the optical leakage is likely to occur in the vicinity of the photospacers 22 due to orientation failure of liquid crystal molecules, it is possible to prevent leaked light from being viewed from outside by using the spacer light-shielding films 19.

Further, the spacer light-shielding film 19 is formed by at least one of the elements constituting the TFT element 58 serving as a switching element. Accordingly, there is no need to prepare specific materials and a dedicated process for forming the spacer light-shielding films 19. For this reason, the invention is advantageous from a viewpoint of the material and production costs.

First Embodiment of Method of Manufacturing Electro-Optical Device

Figure 7:
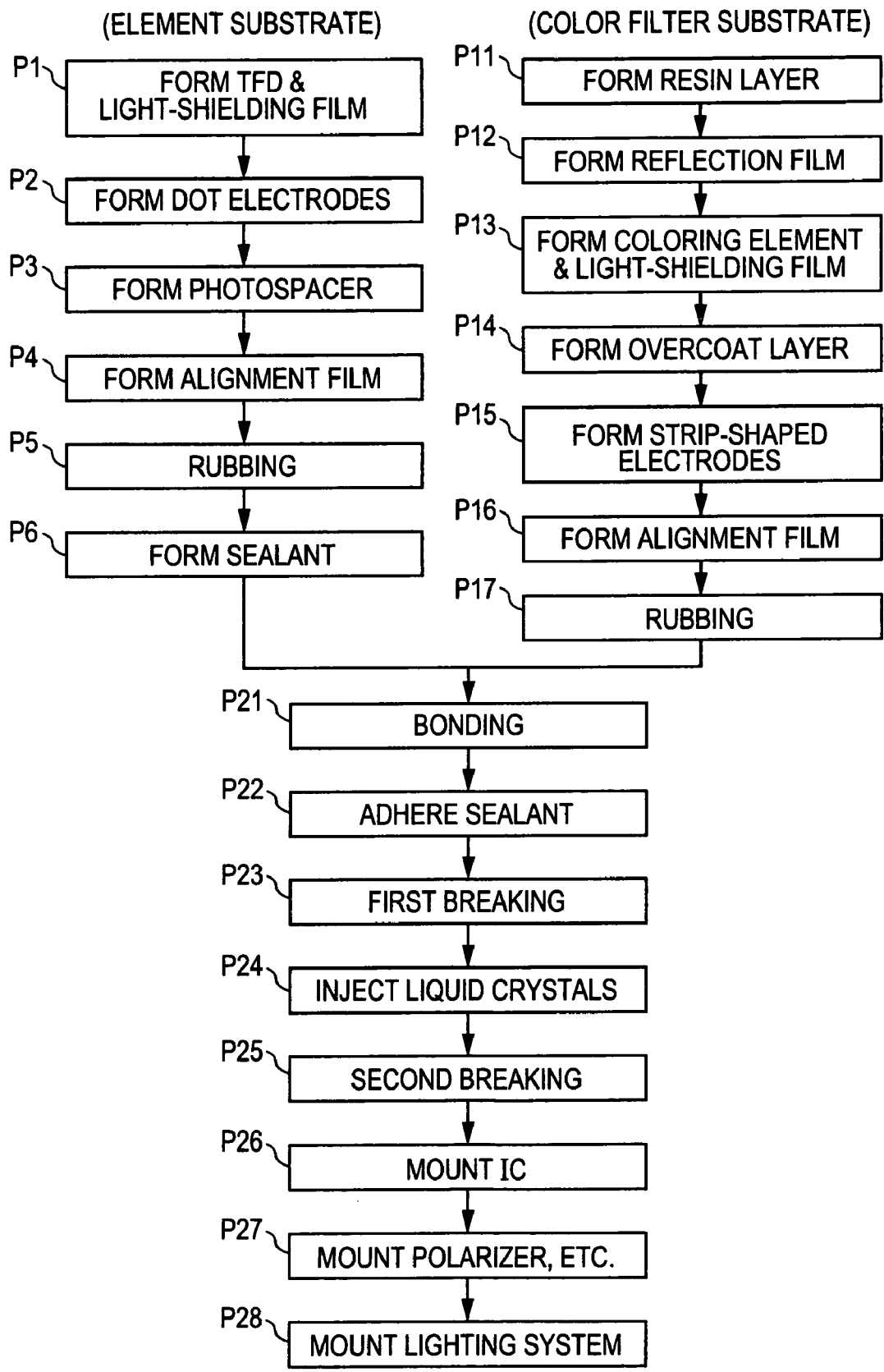
FIG. 7 is a flowchart illustrating a method of manufacturing an electro-optical device according to an embodiment of the invention.

Hereinafter, a method of manufacturing an electro-optical device according to the invention will be described by way of an example in which the liquid crystal display 1 using the TFD element shown in FIG. 1 is manufactured. FIG. 7 is a flowchart illustrating a method of manufacturing an electro-optical device according to an embodiment of the invention. Processes P1 to P6 in FIG. 7 are ones for forming the element substrate 9a of FIG. 1. Further, processes P11 to P17 are ones for forming the color filter substrate 9b of FIG. 1. Moreover, processes P21 to P28 are ones for forming a liquid crystal display, which is a product, by bonding the substrates together.

Furthermore, in the present embodiment, the element substrate 9a and the color filter substrate 9b shown in FIG. 1 are not formed one by one. As far as the element substrate 9a is concerned, a plurality of film elements constituting the element substrate 9a is simultaneously formed on a mother transmissive substrate for an element substrate, having the area enough to form the plurality of element substrates 9a. In addition, as far as the color filter substrate 9b is concerned, a plurality of film elements constituting the color filter substrate 9b is simultaneously formed on a mother transmissive substrate for a color filter substrate, having the area enough to form the plurality of color filter substrates 9b.

First, in process P1 of FIG. 7, a mother transmissive substrate for the element substrate, having a large area, is prepared. The mother transmissive substrate can be made of glass, plastic or the like, which has transmittance. The TFD elements 18 and the wiring lines 17 of FIG. 4 are formed on a surface of the mother transmissive substrate. Specifically, in FIG. 4, the first layer 17a of the wiring line 17 and the first metal 26 of the TFD element 18 are formed to have predetermined shapes by a photo-etching using tantalum as a material. The second layer 17b of the wiring line 17 and the insulating film 27 of the TFD element 18 are formed to cover the first layer 17a and the first metal 26, respectively, by means of the anodic oxidization process. The third layer 17c of the wiring line 17 and the second metal 28 of the TFD element 18 are formed to cover the second layer 17b and the insulating film 27, respectively, by photo-etching using chrome as a material.

Further, in the process of forming the TFD elements 18, the spacer light-shielding films 19 of FIG. 2 are simultaneously formed. For example, the spacer light-shielding film 19 is formed by using a single layer made of tantalum which is the same material as the first metal 26 of the TFD element 18, a single layer made of chrome which is the same material as the second metal 28, or a laminated structure composed of tantalum and chrome. Subsequently, in process P2, the dot electrodes 21 are formed to have predetermined shapes by photo-etching using ITO as a material in such a manner that the dot electrodes 21 overlap the second metals 28 of the second TFD element 18b of the TFD element 18 in FIG. 4.

Thereafter, in process P3, the photospacers 22 of FIG. 2 are formed at predetermined locations in predetermined shapes by a photolithographic process using photosensitive resin, such as a negative resist material. In process P4, the alignment film 23a of FIG. 2 is formed by the photolithographic process using photosensitive resin such as polyimide. Next, in process P5, a rubbing process is performed for the alignment film 23a to give orientation property thereto. Then, in process P6, the sealant 11 of FIG. 1 is formed by, for example, a printing method using an epoxy-based resin material. As such, a plurality of film elements constituting the element substrate 9a is formed on the large-sized mother substrate for the element substrate, thereby forming the large-sized mother element substrate at a side of the element substrate.

Meanwhile, in process P11 of FIG. 7, a mother transmissive substrate for the color filter substrate, having a large area, is prepared. The mother transmissive substrate may be made of glass, plastic or the like, which has transmittance. The resin layer 31 of FIG. 2 is formed on the mother transmissive substrate. Further, irregularities are formed on the resin layer 31. Then, in process P12, the reflection film 32 of FIG. 2 is made of Al, Al alloy or the like, by photo-etching. At that time, the opening K is formed in each of the display dot regions D.

Thereafter, in process P13, the coloring elements 33 of FIG. 2 are formed in a predetermined pattern, such as a stripe arrangement, in the order of blue (B), green (G), and red (R), thereby forming a color filter. These coloring elements 33 may be formed by patterning a coloring material, which is made by distributing pigment or dye having each of the colors in photosensitive resin, using the photolithographic process. Further, when the color filter is formed, a light-shielding member, i.e., a black mask is formed by overlapping the plurality of coloring elements 33 having different colors in the interdot light-shielding region S of FIG. 2.

Thereafter, in process P14, the overcoat layer 34 is formed on the black mask and the coloring element 33 by the photolithographic process using photosensitive resin such as acrylic resin or polyimide resin. In process P15, the stripshaped electrodes 36 of FIG. 2 are formed by the photoetching process using ITO as material. Next, in process P16, the alignment film 23b is formed by the photolithographic process using photosensitive resin such as polyimide. In process P17, a rubbing process as an orientation process is performed for the alignment film 23b. Thus, a plurality of film elements of the color filter substrate 9b, etc. is formed on the large-sized mother transmissive substrate for the color filter substrate, thereby forming the large-sized mother color filter substrate at a side of the color filter substrate 9b.

After the two mother substrates, i.e., the mother element substrate and the mother color filter substrate are formed as such, mother substrates at both sides are aligned, i.e., positioned and then bonded, in process P21 of FIG. 7. Then, in process P22, the sealant 11 of FIG. 1 is hardened by heat or ultraviolet irradiation, thereby bonding both mother substrates together. As such, a large-sized panel structure, having the plurality of liquid crystal panels 2 which are respectively the liquid crystal panels 2 of FIG. 1 and in which liquid crystal is not sealed, is completed.

Thereafter, in process P23, the large-sized panel structure is cut once, i.e., a first breaking is performed for the large-area panel structure to form a plurality of panel structures having an intermediate area, that is, stripe-shaped panel structures each of which includes the plurality of liquid crystal panels 2 of FIG. 1 lined up in a row. Also, openings are formed at proper positions of the sealant 11. When the strip-shaped panel structure is formed through the first breaking, the openings of the sealant 11 are exposed outside. Then, in process P24, liquid crystal is injected inside each of the liquid crystal panels through the openings of the sealant 11. In the present embodiment, TN liquid crystal is injected. After the injection is completed, the openings of the sealant are sealed with resin.

Thereafter, in process P25, a second cut, i.e., a second breaking is performed to cut the individual liquid crystal panels 2 shown in FIG. 1 from the strip-shaped panel structure. In process P26, the driving ICs 3 of FIG. 1 are mounted on an expansion part 29 of the element substrate 9a. Next, in process P27, the retardation films 13a and 13b and the polarizers 14a and 14b are adhered to external surfaces of the element substrate 9a and the color filter substrate 9b. In process P28, the lighting unit 4 is mounted on the liquid crystal panel 2. As such, a TFD type liquid crystal display 1 is completed.

In accordance with the method of manufacturing the liquid crystal display as described above, the liquid crystal display 1 having the photospacers 22 and the spacer light-shielding films 19 can be reliably manufactured as shown in FIG. 2. Further, since the spacer light-shielding films 19 are formed by using the same material and process as those used to form elements of the TFD element 18, it is possible to reduce component and production costs.

Second Embodiment of Method of Manufacturing Electro-Optical Device

Figure 12:
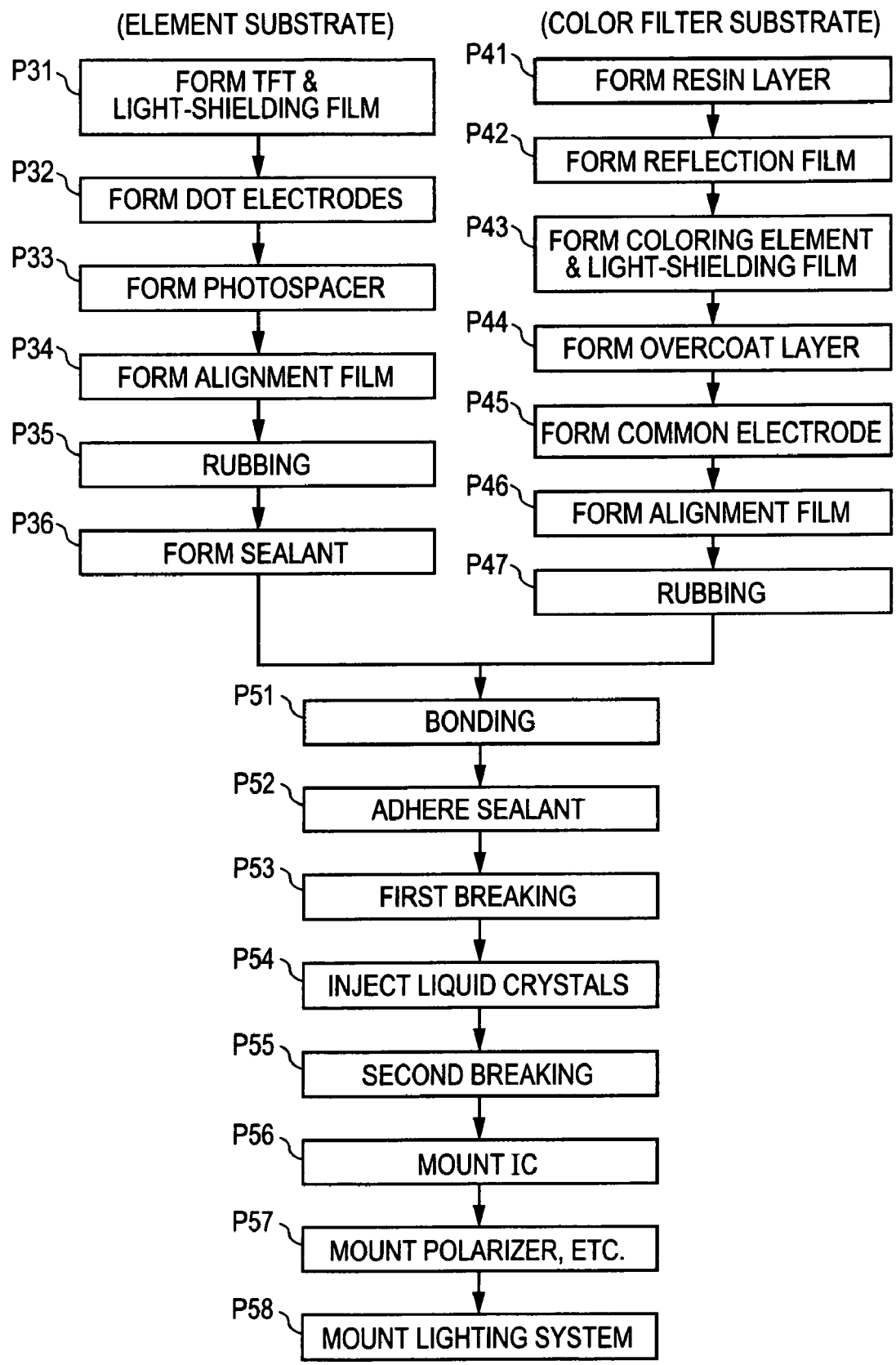
FIG. 12 is a flowchart illustrating a method of manufacturing an electro-optical device according to another embodiment of the invention.

Hereinafter, a method of manufacturing an electro-optical device according to another embodiment of the invention will be described by way of an example in which the liquid crystal display 41 using the TFD elements shown in FIG. 1 is manufactured. FIG. 12 is a flowchart illustrating a method of manufacturing an electro-optical device according to another embodiment of the invention. Processes from a process P31 to a process P36 in FIG. 12 are ones for forming the element substrate 9a of FIG. 1. Further, processes from a process P41 to a process P47 are ones for forming the color filter substrate 9b of FIG. 1. Moreover, processes from a process P51 to a process P58 are ones for forming a liquid crystal display, which is a product, by bonding the substrates together.

Further, in the present embodiment, the element substrate 9a and the color filter substrate 9b shown in FIG. 1 are not formed one by one. As far as the element substrate 9a is concerned, a plurality of film elements of the element substrate 9a is simultaneously formed on a mother transmissive substrate for an element substrate having an area enough to form a plurality of the element substrates 9a. Further, as far as the color filter substrate 9b is concerned, a plurality of film elements of the color filter substrate 9b is simultaneously formed on a mother transmissive substrate for a color filter substrate having an area enough to form the plurality of the color filter substrates 9b.

First, in process P31 of FIG. 12, a mother transmissive substrate for the element substrate, having a large size, is prepared. The mother transmissive substrate can be made of glass, plastic or the like, which has transmittance. The TFD elements 58 of FIG. 10 are formed on a surface of the mother transmissive substrate in a predetermined laminated structure by the photo-etching process, etc. Further, the gate electrode lines 51' and the source electrode lines 54' of FIG. 9 are formed at the same time. Moreover, in the process for forming the TFT elements, the spacer light-shielding films 19 of FIG. 8 are simultaneously formed. For example, the spacer light-shielding film 19 is formed by one of the gate electrode 51, the source electrode 54 and the drain electrode 56 of the TFT element 58, or a combination thereof.

Then, in process P32, the dot electrodes 21 are formed to have predetermined shapes by the photo-etching process using ITO as a material such that the dot electrodes overlap the drain electrodes 56 of the TFD elements 58 of FIG. 10. Next, in process P33, the photospacers 22 of FIG. 10 are formed at predetermined locations in a predetermined shape by the photolithographic process using photosensitive resin, such as a negative resist material. Thereafter, in process P34, the alignment film 23a of FIG. 10 is formed by the photolithographic process using photosensitive resin such as polyimide. Next, in process P35, a rubbing process is performed for the alignment film 23a blue, green, and red to give orientation property thereto. Next, in process P36, the sealant 11 of FIG. 1 is formed by, for example, a printing method using an epoxy-based resin material. Thus, a plurality of film elements of the element substrate 9a is formed on the large-sized mother transmissive substrate for the element substrate, thereby forming the large-sized mother element substrate at a side of the element substrate 9a.

Meanwhile, in process P41 of FIG. 12, a mother transmissive substrate for the color filter substrate, having a large size, is first prepared. The mother transmissive substrate may be made of glass, plastic or the like, which has transmittance. The resin layer 31 of FIG. 8 is formed on the mother transmissive substrate. Further, irregularities are formed on the resin layer 31. Then, in process P42, the reflection film 32 of FIG. 2 is made of Al, Al alloy or the like, by means of the photo-etching process. At that time, the opening K is formed in each of the display dot regions D.

Then, in process P43, the coloring elements 33 of FIG. 8 are formed in a predetermined pattern, such as a stripe arrangement, blue, green, and red of blue (B), green (G), and red (R), thereby forming the color filter. These coloring elements 33 may be formed by patterning a coloring material, which is made by distributing pigment or dye of each of the colors in photosensitive resin, by means of the photolithographic process. Further, when the color filter is formed, a light-shielding member, i.e., a black mask is formed by overlapping the plurality of coloring elements 33 having different colors in the interdot light-shielding region S of FIG. 8.

Thereafter, in process P44, the overcoat layer 34 is formed on the black mask and the coloring element 33 by the photolithographic process using photosensitive resin such as acrylic resin or polyimide resin. In process P45, the strip-shaped electrodes 36 of FIG. 8 are formed by the photo-etching process using ITO. Next, in process P46, the alignment film 23b is formed by the photolithographic process using photosensitive resin such as polyimide. In process P47, a rubbing process as an orientation process is performed for the alignment film 23b. Thus, a plurality of film elements of the color filter substrate 9b, etc. is formed on the large-sized mother transmissive substrate for the color filter substrate, thereby forming the large-area mother color filter substrate at a side of the color filter substrate 9b.

After the two mother substrates, i.e., the mother element substrate and the mother color filter substrate are formed as such, the mother substrates at both sides are aligned, i.e., positioned and then bonded together, in process P51 of FIG. 12. Then, in process P52, the sealant 11 of FIG. 1 is hardened by heat or ultraviolet irradiation, thereby bonding the mother substrates together. As such, the large-area panel structure, having the plurality of liquid crystal panels 2 which are respectively the liquid crystal panels 2 of FIG. 1 and in which liquid crystal is not sealed, is completed.

Thereafter, in process P53, the large-sized panel structure is cut once, i.e., a first breaking is performed for the large-area panel structure to form a plurality of panel structures having an intermediate area, that is, stripe-shaped panel structures each of which includes the plurality of liquid crystal panels 2 of FIG. 1 lined up in a row. Also, openings are formed at proper positions of the sealant 11. When the strip-shaped panel structure is formed through the first breaking, the openings of the sealant 11 are exposed outside. Then, in process P54, liquid crystal is injected inside each of the liquid crystal panels through the opening of the sealant 11. In the present embodiment, TN liquid crystal is injected. After the injection is completed, the openings of the sealant are sealed with resin.

Thereafter, in process P55, a second cut, i.e., a second breaking is performed to cut the individual liquid crystal panels 2 shown in FIG. 1 from the strip-shaped panel structure. In process P56, the driving ICs 3 of FIG. 1 are mounted on an expansion part 29 of the element substrate 9a. Next, in process P57, the retardation films 13a and 13b and the polarizers 14a and 14b are adhered to external surfaces of the element substrate 9a and the color filter substrate 9b. In process P58, the lighting unit 4 is mounted on the liquid crystal panel 2. As such, a TFD type liquid crystal display 1 is completed.

In accordance with the method of manufacturing the liquid crystal display as described above, the liquid crystal display 41 having the photospacers 22 and the spacer light-shielding films 19 can be reliably manufactured as shown in FIG. 8. Further, since the spacer light-shielding films 19 are formed by using the same material and process as those used to form elements of the TFD element 58, it is possible to reduce the component and production costs.

Other Embodiments Regarding Electro-Optical Device and Method of Manufacturing the Same Although the electro-optical device and the method of manufacturing the same according to the embodiments of the invention have been described above, it is to be noted that the invention is not limited thereto, but can be modified in various ways without departing from the spirit and scope of the invention and appended claims.

For example, although TN type liquid crystal has been used in the embodiments, the invention may be applied to liquid crystal displays using STN (Super Twisted Nematic) type liquid crystal. Further, the invention may be applied to liquid crystal displays using bistable liquid crystal having memory property, such as a BTN (Bistable Twisted Nematic) type liquid crystal and a ferroelectric type liquid crystal, and to liquid crystal displays using polymer-distribution-type liquid crystal. The invention can also be applied to liquid crystal displays using GH (Guest-Host) type liquid crystal, in which dye molecules are arranged parallel to liquid crystal molecules by dissolving dyes (so-called guest), having anisotropy in absorbing visible rays in a long-axis direction and a short-axis direction of molecules, in liquid crystal (so-called host) having predetermined molecular arrangement.

Further, the invention can be applied to liquid crystal displays using vertically aligned (that is, homeotropically aligned) liquid crystal, in which liquid crystal molecules are arranged in a direction perpendicular to both substrates when no voltage is applied, whereas the liquid crystal molecules are arranged in a direction horizontal to both substrates when a voltage is applied. In addition, the invention can be applied to liquid crystal displays using parallel aligned or horizontally aligned (so-called homogeneously aligned) liquid crystal, in which liquid crystal molecules are arranged in a direction horizontal to both substrates when no voltage is applied, whereas liquid crystal molecules are arranged in a direction perpendicular to both substrates when a voltage is applied.

Furthermore, although the TFT elements serving as switching elements have been formed by using amorphous silicon in the embodiments, the TFT elements may be formed with polysilicon.

Moreover, although the liquid crystal display has been used as an example of the electro-optical device in the embodiments, the invention can be applied to various electro-optical devices, such as organic EL devices, inorganic EL devices, plasma display devices, electrophoretic display devices, and field emission display devices.

Embodiment of Electronic Apparatus

Hereinafter, an electronic apparatus according to the invention will be described in conjunction with a preferred embodiment. Further, the embodiment is an example of the invention, but the invention is not limited thereto.

Figure 13:
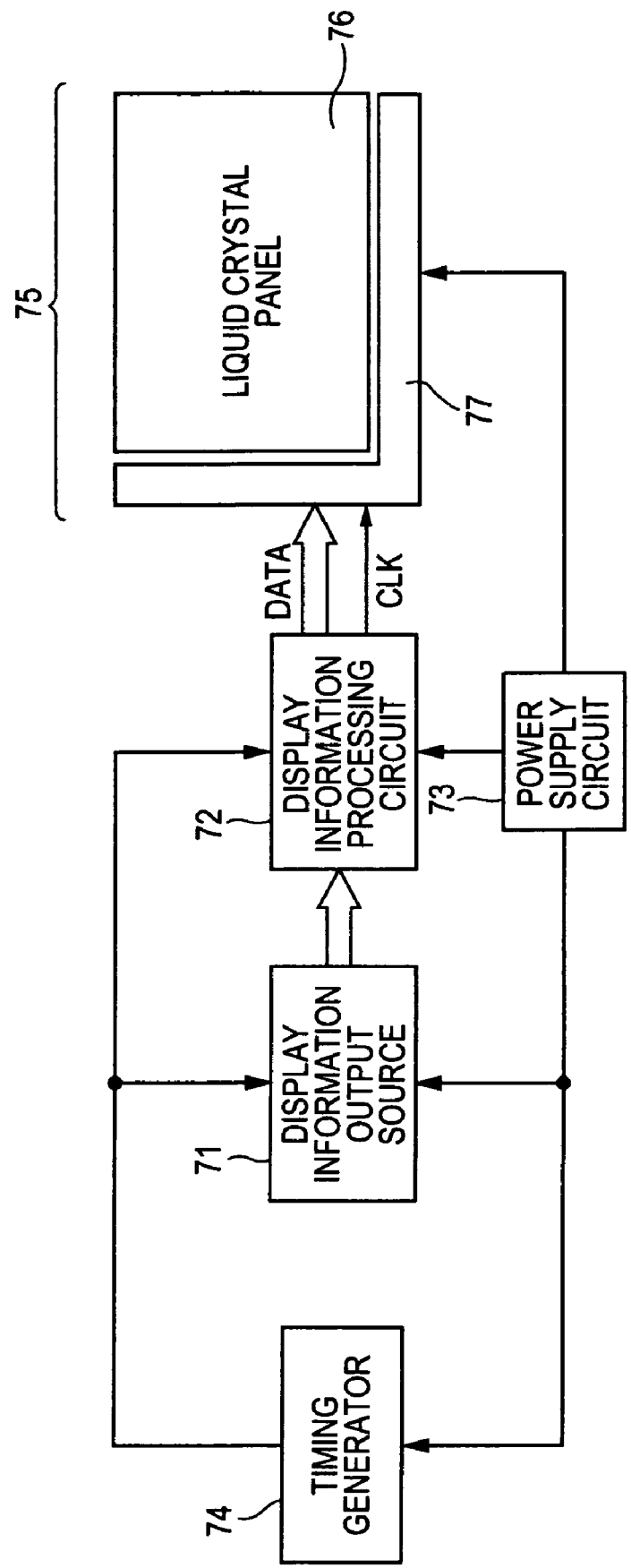
FIG. 13 is a block diagram of an electronic apparatus according to an embodiment of the invention.

FIG. 13 is a block diagram of an electronic apparatus according to an embodiment of the invention. In the drawing, the electronic apparatus includes a display information output source 71, a display information processing circuit 72, a power supply circuit 73, a timing generator 74, and a liquid crystal display 75. Further, the liquid crystal display 75 includes a liquid crystal panel 76 and a driving circuit 77.

The display information output source 71 includes a memory such as RAM (Random Access Memory), a storage unit such as various disks, a tuning circuit that tunes and outputs a digital image signal, and the like. The display information output source 71 supplies display information, such as an image signal having a predetermined format, to the display information processing circuit 72 based on various clock signals generated from the timing generator 74.

The display information processing circuit 72 includes a plurality of known circuits such as amplifying and inverting circuits, a rotation circuit, a gamma correction circuit and a clamping circuit. The display information processing circuit 72 performs a process on inputted display information and supplies an image signal to the driving circuit 77 along with a clock signal CLK. Here, the driving circuit 77 as well as a scanning line driving circuit or a data line driving circuit generally refers to a test circuit, etc. Further, the power supply circuit 73 supplies predetermined a power supply voltage to the respective elements.

The liquid crystal display 75 can employ the liquid crystal display 1 or the liquid crystal display 41 shown in FIG. 1. In the liquid crystal display 1 or the liquid crystal display 41, since the photospacers 22 (see FIG. 2, FIG. 8, etc.) are formed, orientation failures of liquid crystal molecules are likely to occur in the vicinity of the photospacers 22, which may result in optical leakage. However, according to the invention, since the spacer light-shielding films 19 are formed between the photospacers 22 and the transmissive substrate 12a, respectively, the optical leakage is prevented by the spacer light-shielding films 19, and thus the optical leakage cannot be seen from the outside. Accordingly, it is possible to maintain high-quality display in the liquid crystal displays 1 and 41. As a result, even in the electronic apparatus using the liquid crystal displays 1 and 41, display having high image quality can be realized.

Further, in the liquid crystal displays 1 and 41, each of the spacer light-shielding films 19 is formed by using the same material as at least one of the plurality of elements constituting a switching element, such as the TFD element 18 or the TFT element 58, so that it is not necessary to prepare specific materials and a dedicated process for forming the spacer light-shielding films 19. Thus, it is possible to suppress the cost at a low level. Accordingly, even in the electronic apparatus using the liquid crystal displays 1 and 41, the cost can be suppressed at a low level.

Figure 14:
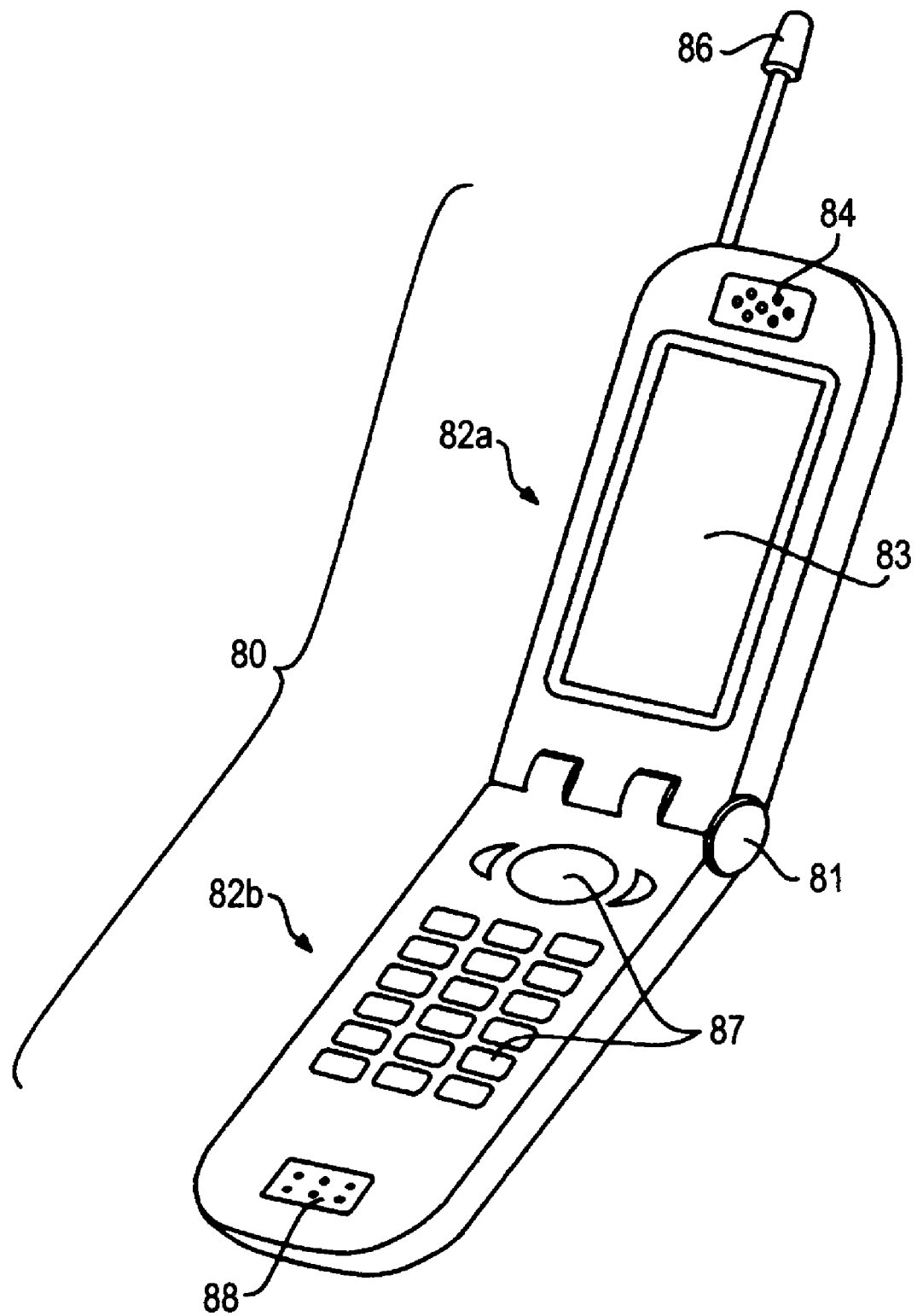
FIG. 14 is a perspective view illustrating an electronic apparatus according to another embodiment of the invention.

FIG. 14 is a perspective view illustrating an electronic apparatus according to another embodiment of the invention. In the drawing, a mobile phone 80 includes a first body 82a and a second body 82b, which can be folded around a hinge 81. Further, the first body 82 includes a liquid crystal display 83, an earpiece 84 and an antenna 86. Moreover, the second body 82b has a plurality of operation buttons 87 and a mouthpiece 88. If the liquid crystal display 83 is formed of the liquid crystal display 1 or the liquid crystal display 41 of FIG. 1, a display unit having a high display quality can be manufactured at low cost without generating failure such as optical leakage.

Other Embodiments Regarding Electronic Apparatus

Furthermore, an electronic apparatus may include a personal computer, a liquid crystal television, a view finder type or monitor direct view type video tape recorder, a car navigation apparatus, a pager, an electronic diary, a desktop calculator, a word processor, a work station, a video phone, a POS terminal and the like, as well as the mobile phone described above.

The electro-optical device according to the invention can be preferably used as a display device when performing various displays using mobile phones, handheld terminals and other electronic apparatuses. Also, the method of manufacturing the electro-optical device according to the invention is preferably used when manufacturing an electro-optical device having a structure in which a cell gap is maintained by photospacers. Moreover, the electronic apparatus according to the invention can be used as consumer devices such as mobile phones and handheld terminals, or measuring equipments, or industrial equipments and the like.

What is claimed is:

1. A method of manufacturing an electro-optical device, comprising:
    forming a switching unit on a substrate;
    forming spacer light-shielding films on the substrate;
    forming an electrode on the substrate to be electrically connected to the switching unit, the switching unit including a plurality of elements;
    forming photospacers for maintaining the thickness of an electro-optical material layer, each photospacer being formed over a corresponding one of the plurality of spacer light-shielding films; and
    positioning the electro-optical material layer on the substrate to overlap the electrode,
    wherein the forming of the spacer light-shielding films is simultaneously formed and uses the same material and process as those used to form at least one of a plurality of elements constituting the switching unit.

2. The method of manufacturing an electro-optical device according to claim 1, further comprising:
    forming interdot light-shielding regions so as to bury a plurality of display dot regions, each being a display unit,
    wherein the photospacers are provided within the display dot regions.

3. The method of manufacturing an electro-optical device according to claim 2, further comprising:
    forming a plurality of coloring elements, each having a different color, at a side opposite to the substrate with the electro-optical materials therebetween,
    wherein, in the forming of the interdot light-shielding regions, the interdot light-shielding regions are formed by overlapping the coloring elements with different colors.

4. The method of manufacturing an electro-optical device according to claim 1,
    wherein the forming of the switching unit includes:
    forming a first metal on the substrate;
    forming an insulating film on the first metal; and
    forming a second metal on the insulating film,
    wherein the forming of the spacer light-shielding films is performed using the same material and process as those used to form the first or second metals.

* * * * *